United States Patent
Friedman et al.

(10) Patent No.: US 9,819,233 B2
(45) Date of Patent: Nov. 14, 2017

(54) INTERNAL ROTOR SENSOR HAVING ADJUSTABLE SENSOR CARRIER

(71) Applicant: Nidec Motor Corporation, St. Louis, MO (US)

(72) Inventors: Kenneth R. Friedman, Smithton, IL (US); Ronald W. Schmidt, St. Louis, MO (US); Steven P. Randall, West Yorkshire (GB)

(73) Assignee: Nidec Motor Corporation, St. Louis, MO (US)

( * ) Notice: Subject to any disclaimer, the term of this patent is extended or adjusted under 35 U.S.C. 154(b) by 464 days.

(21) Appl. No.: 14/614,216

(22) Filed: Feb. 4, 2015

(65) Prior Publication Data
US 2015/0229187 A1    Aug. 13, 2015

Related U.S. Application Data

(60) Provisional application No. 61/937,358, filed on Feb. 7, 2014, provisional application No. 61/937,968, filed on Feb. 10, 2014.

(51) Int. Cl.
| | |
|---|---|
| *H02K 5/04* | (2006.01) |
| *H02K 1/18* | (2006.01) |
| *H02K 5/16* | (2006.01) |
| *G01B 7/30* | (2006.01) |
| *H02K 3/52* | (2006.01) |
| *H02K 5/173* | (2006.01) |
| *H02K 11/215* | (2016.01) |

(52) U.S. Cl.
CPC ............... *H02K 1/185* (2013.01); *G01B 7/30* (2013.01); *H02K 3/522* (2013.01); *H02K 5/04* (2013.01);
(Continued)

(58) Field of Classification Search
CPC ...... H02K 1/185; H02K 11/215; H02K 3/522; H02K 5/04; H02K 5/161; H02K 5/1732
(Continued)

(56) References Cited

U.S. PATENT DOCUMENTS 5,831,358 A * 11/1998 Bobay ...................... H02K 7/04
                                                        310/216.117
5,866,962 A    2/1999 Kim
(Continued)

FOREIGN PATENT DOCUMENTS

JP    08-054406 A    2/1996

OTHER PUBLICATIONS

International Search Report and Written Opinion from PCT Application No. PCT/US2015/014517 entitled Internal Rotor Sensor Having Adjustable Sensor Carrier (dated Apr. 29, 2015).

*Primary Examiner* — Terrance Kenerly
(74) *Attorney, Agent, or Firm* — Hovey Williams LLP

(57) ABSTRACT

An electric motor is provided. A rotor sensor mechanism is operable to sense a condition of the rotor. The rotor sensor mechanism includes a target component, a radial sensor, and a sensor carrier. The target component comprises a shutter wheel fixed relative to the rotor for rotational movement therewith. The shutter wheel includes a plurality of circumferentially spaced, radially projecting radial target teeth. The radial sensor is configured to sense the target teeth. The radial sensor is at least generally axially aligned with the radial target teeth and faces radially toward the radial target teeth. The sensor carrier adjustably supports the radial sensor on the motor frame assembly so as to permit the radial sensor to be selectively positioned relative to the radial target teeth.

22 Claims, 31 Drawing Sheets

(52) U.S. Cl.
CPC ........... *H02K 5/161* (2013.01); *H02K 5/1732* (2013.01); *H02K 11/215* (2016.01); *H02K 2203/09* (2013.01)

(58) Field of Classification Search
USPC ...................................................... 310/68 B
See application file for complete search history.

(56) References Cited

U.S. PATENT DOCUMENTS

| | | | |
|---|---|---|---|
| 2001/0015582 A1* | 8/2001 | Nakajima | H02K 29/08 310/68 B |
| 2006/0159551 A1 | 7/2006 | Hoglund | |
| 2006/0226719 A1* | 10/2006 | Nakanishi | H02K 7/20 310/68 B |
| 2007/0114864 A1 | 5/2007 | Son | |
| 2007/0203010 A1 | 8/2007 | Kim et al. | |
| 2007/0210666 A1* | 9/2007 | Yoshida | H02K 3/50 310/191 |
| 2007/0247012 A1* | 10/2007 | Shin | H02K 1/276 310/156.06 |
| 2008/0197729 A1* | 8/2008 | Igarashi | H02K 5/225 310/71 |
| 2008/0252160 A1* | 10/2008 | Kavalsky | H01R 13/6658 310/71 |
| 2009/0015111 A1* | 1/2009 | Chen | H02K 11/22 310/68 B |
| 2011/0175641 A1 | 7/2011 | Wiesendanger et al. | |
| 2011/0187242 A1* | 8/2011 | Takeuchi | H02K 21/02 310/68 B |

* cited by examiner

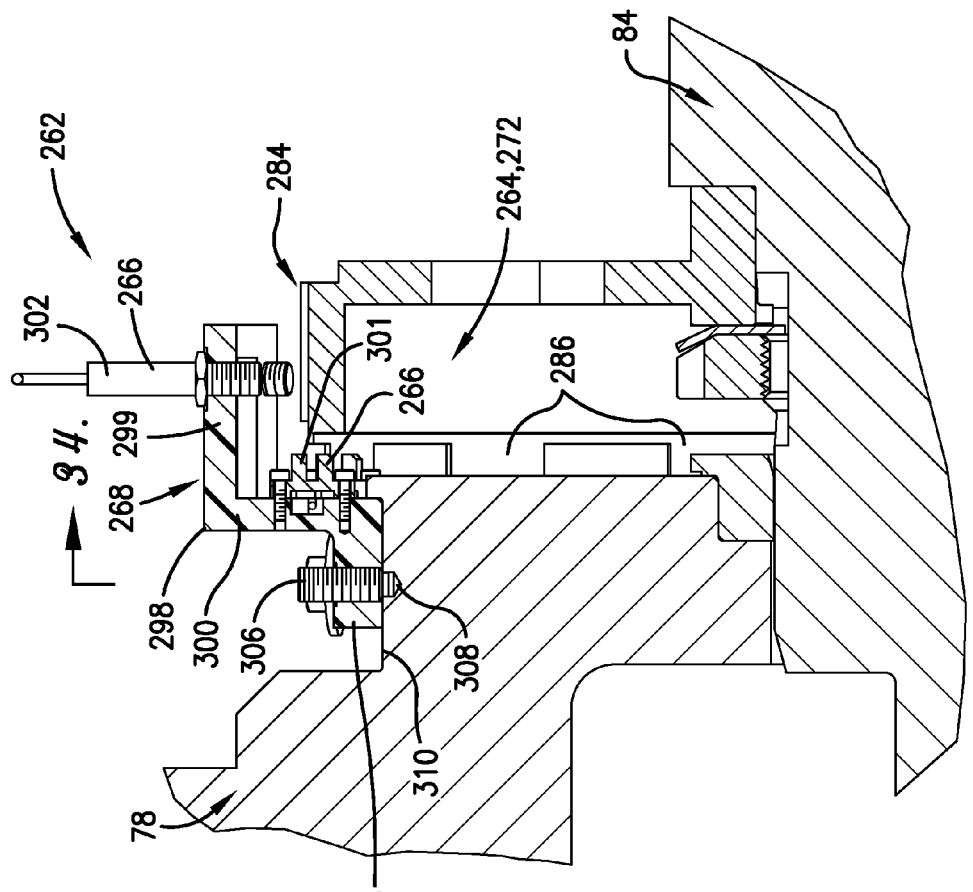
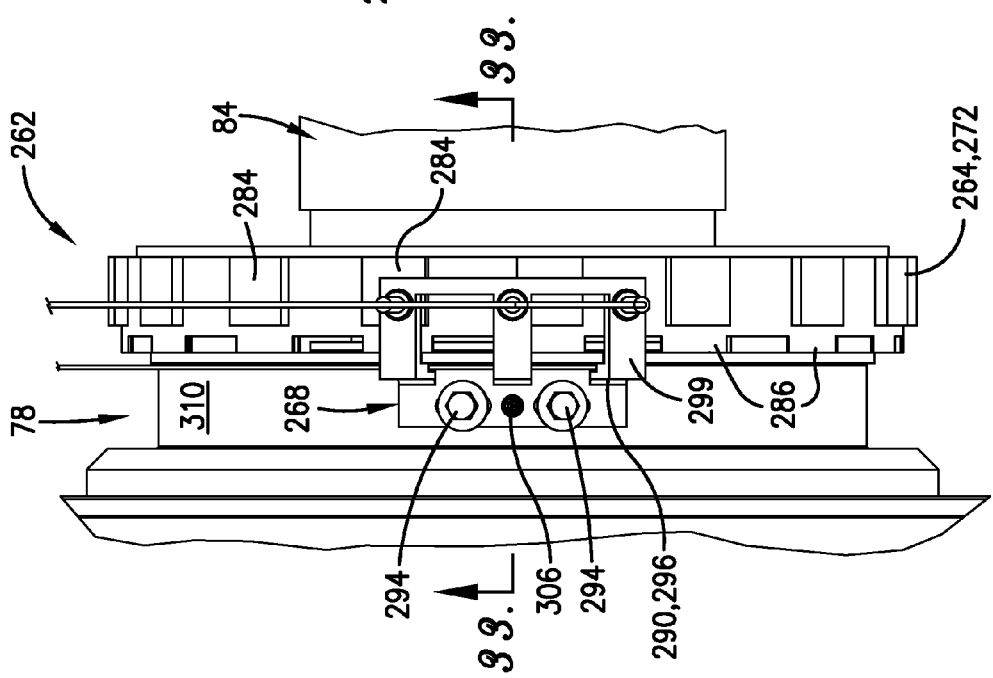

INTERNAL ROTOR SENSOR HAVING ADJUSTABLE SENSOR CARRIER

CROSS-REFERENCE TO RELATED APPLICATIONS

The present application claims priority from U.S. Provisional Patent Application Ser. No. 61/937,358, filed Feb. 7, 2014, and U.S. Provisional Patent Application Ser. No. 61/937,968, filed Feb. 10, 2014, the entire disclosures of each of which are hereby incorporated by reference herein.

The above-referenced provisional patent applications relate to and have the same priority dates as corresponding ones of the following provisional patent applications: U.S. Provisional Patent Application Ser. No. 61/937,363, filed Feb. 7, 2014, and U.S. Provisional Patent Application Ser. No. 61/937,972, filed Feb. 10, 2014, each entitled ROTOR SHAFT JACK; U.S. Provisional Patent Application Ser. No. 61/937,369, filed Feb. 7, 2014, and U.S. Provisional Patent Application Ser. No. 61/937,980, filed Feb. 10, 2014, each entitled TAPERED BEARING HOUSING AT COUPLED END OF CLOSE-COUPLED MOTOR; U.S. Provisional Patent Application Ser. No. 61/937,297, filed Feb. 7, 2014, and U.S. Provisional Patent Application Ser. No. 61/937,981, filed Feb. 10, 2014, each entitled STATOR CAGE FOR LARGE MOTOR; and U.S. Provisional Patent Application Ser. No. 61/937,366, filed Feb. 7, 2014, and U.S. Provisional Patent Application Ser. No. 61/937,988, filed Feb. 10, 2014, each entitled ROTOR HAVING END BAFFLE FOR DIVERTING COOLANT. The entire disclosures of each of the above-referenced related provisional applications are hereby incorporated by reference herein.

BACKGROUND OF THE INVENTION

1. Field of the Invention

The present invention relates generally to electric motors. More specifically, the present invention concerns a motor assembly having an adjustably mounted rotor sensor.

2. Discussion of the Prior Art

Those of ordinary skill in the art will appreciate that motors are used in a variety of applications, including, but not limited to, driving centrifugal pumps (such as slurry pumps). In various applications, it is desirable to sense rotor conditions, such as position, direction, and speed. Typically, sensors are fixed relative to the motor frame, and are positioned relative to a shutter wheel that is adjustably positioned on the rotor shaft. When adjustments to the motor assembly are made, the shutter wheel is often recalibrated by adjusting the shutter wheel relative to the rotor shaft. In certain applications (such as centrifugal pump applications), however, where motor components are generally very heavy and the sensor mechanism is located internally within the motor housing, recalibration of the shutter wheel is difficult.

SUMMARY

According to one aspect of the present invention, an electric motor is provided. The motor comprises a motor frame assembly including a motor frame and a motor housing, a rotor rotatable relative to the motor frame assembly about an axis, a stator fixed relative to the motor frame assembly, and a rotor sensor mechanism for sensing a condition of the rotor. The motor frame assembly defines an internal motor chamber. The rotor sensor mechanism includes a target component comprising a shutter wheel fixed relative to the rotor for rotational movement therewith. The shutter wheel includes a plurality of targets. The rotor sensor mechanism further includes a sensor configured to sense the targets and a sensor carrier adjustably supporting the sensor on the motor frame assembly so as to permit the sensor to be selectively positioned relative to the targets. The rotor, the stator, and the rotor sensor mechanism are at least substantially received in the motor chamber. The motor housing presents an access window which provides access to the motor chamber, with the sensor carrier being adjacent the window. The motor housing includes a removable access plate which covers the window. Removal of the access plate provides access via the window to the sensor carrier.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 32 is a top fragmentary view of the structure depicted in FIGS. 27-29;

FIG. 33 is a cross-sectional view taken along line 33-33 of FIG. 32.

Figure 1:
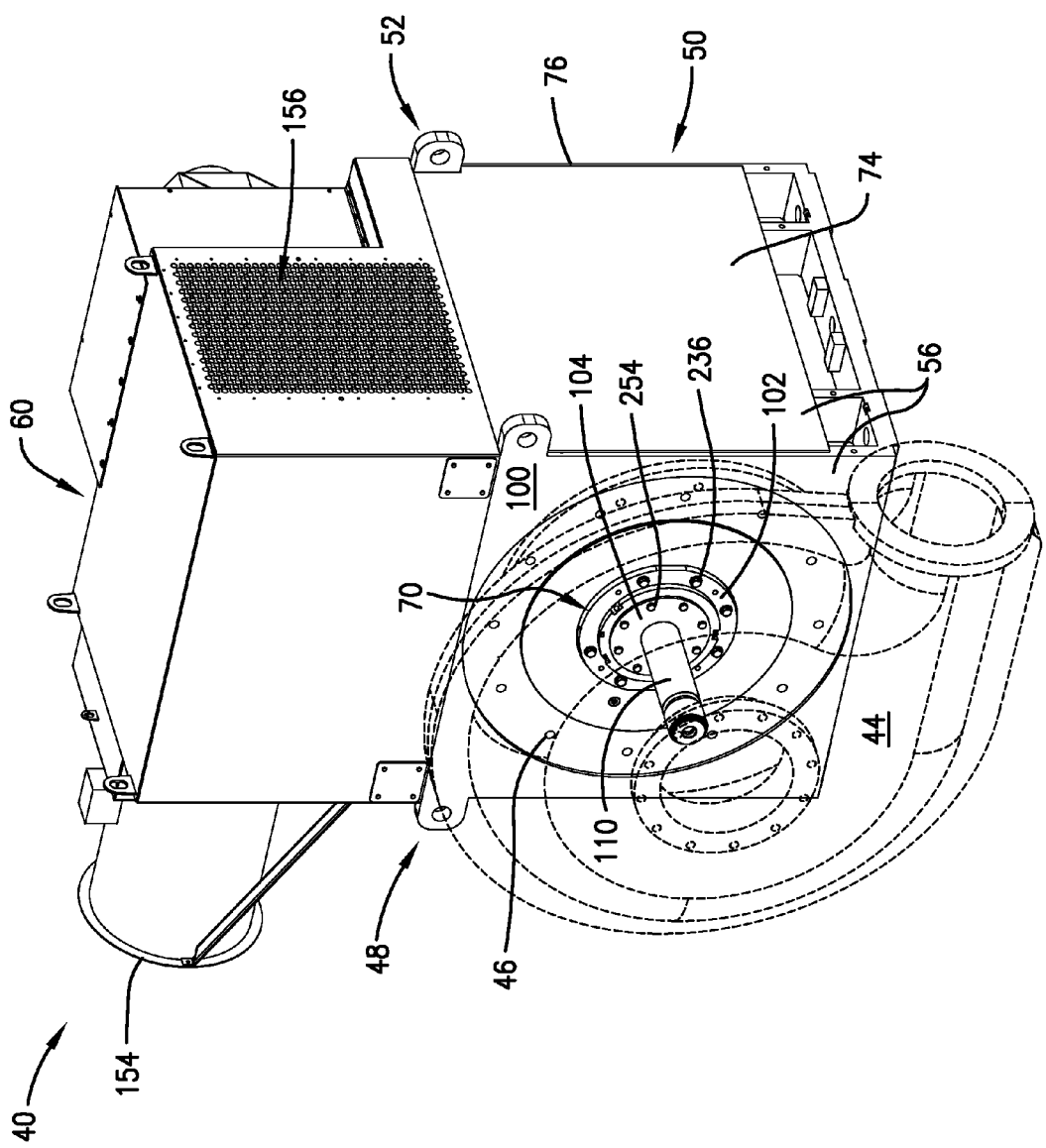
FIG. 1 is a front perspective view of a motor assembly constructed in accordance with a preferred embodiment of the present invention, wherein the motor assembly is illustrated in a close-coupled relationship with a large centrifugal pump.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIG. 1, a pump-motor assembly 40 constructed in accordance with the principles of an embodiment of the present invention is depicted for use in various applications. The illustrated pump-motor assembly comprises a switched-reluctance motor assembly 42 closely coupled to a centrifugal pump 44 and is configured to provide driving power thereto, as will be readily understood by one of ordinary skill in the art. The motor assembly 42 presents a plurality of mounting holes 46 for receiving fasteners (not shown) secured to a centrifugal pump 44, although various connecting structures (also not shown) may be alternatively used without departing from the teachings of the present invention.

While the pump-motor assembly 40 is useful in various applications, the illustrated embodiment has particular utility when the motor assembly 40 is configured to provide driving power to a centrifugal pump 44, such as a slurry pump, and is used as a centrifugal slurry pump motor. Such slurry pumps are used in various applications, but the illustrated embodiment is particularly suited for use in mining operations, such as transporting mined material and liquid as desired. The structure and operation of the centrifugal pump 44 may be generally conventional in nature and need not be described in further detail here.

Figure 2:
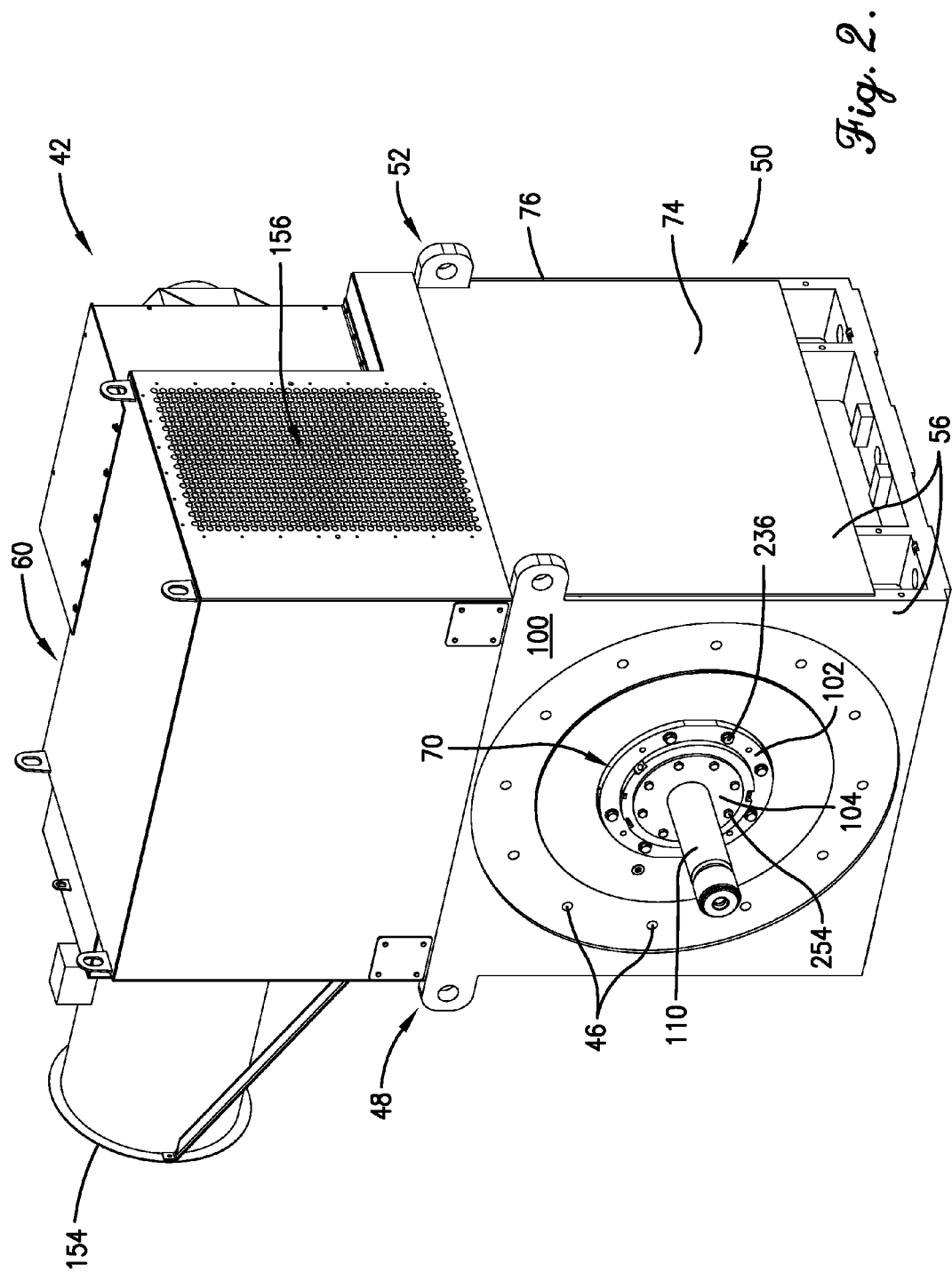
FIG. 2 is a front perspective view of the motor assembly of FIG. 1, with the pump being removed.
Figure 3:
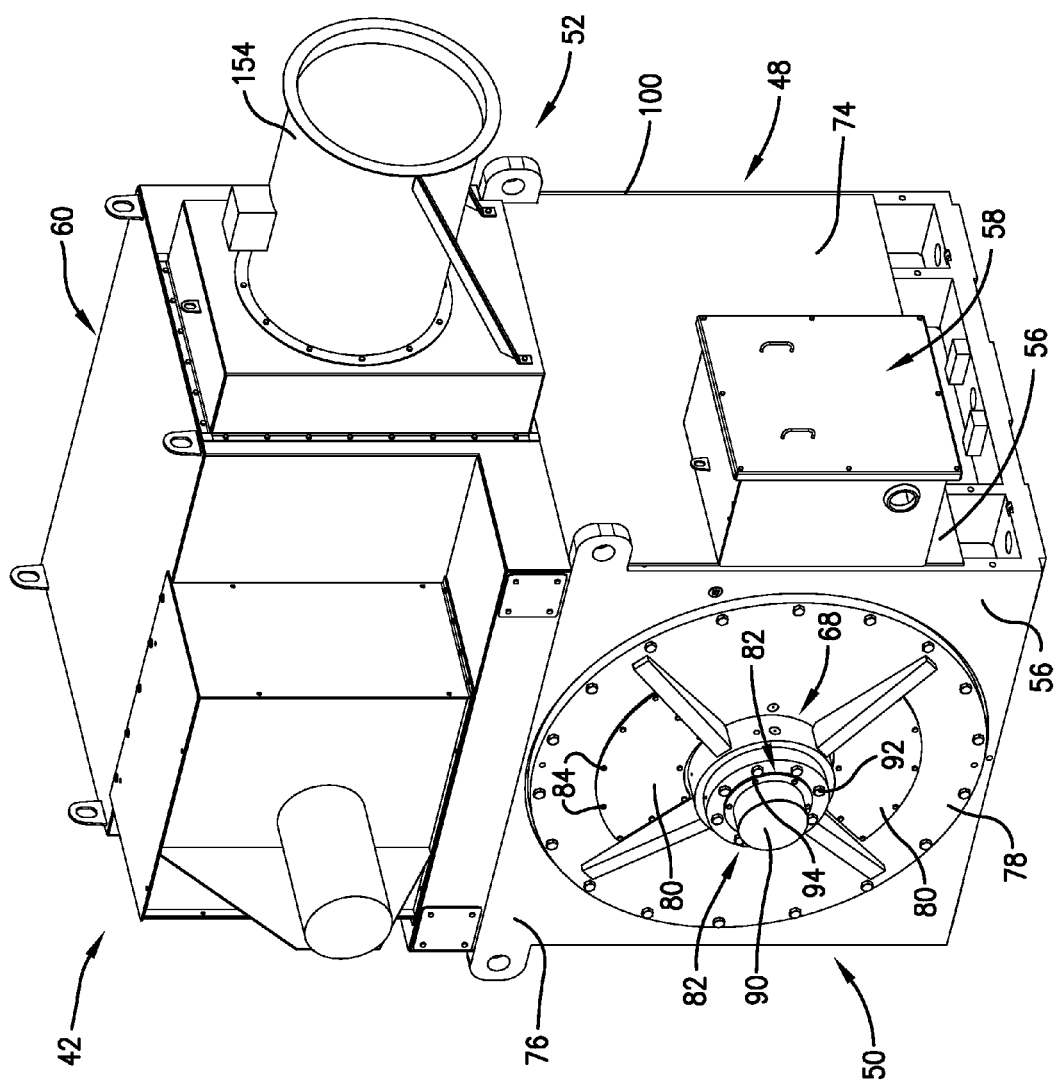
FIG. 3 is a rear perspective view of the motor assembly, as depicted in FIG. 2.

Referring to the drawings, first to FIGS. 2 and 3, the motor assembly 42 presents a drive end 48 and a closed end 50. The motor assembly 42 broadly includes a motor frame assembly 52 having a motor frame 54 and a motor housing 56. The motor assembly 42 also includes a main power component 58 for providing electrical power to at least some parts of the motor assembly 42, and a coolant gas system 60 for cooling at least some parts of the motor assembly 42 as described in more detail below.

Figure 4:
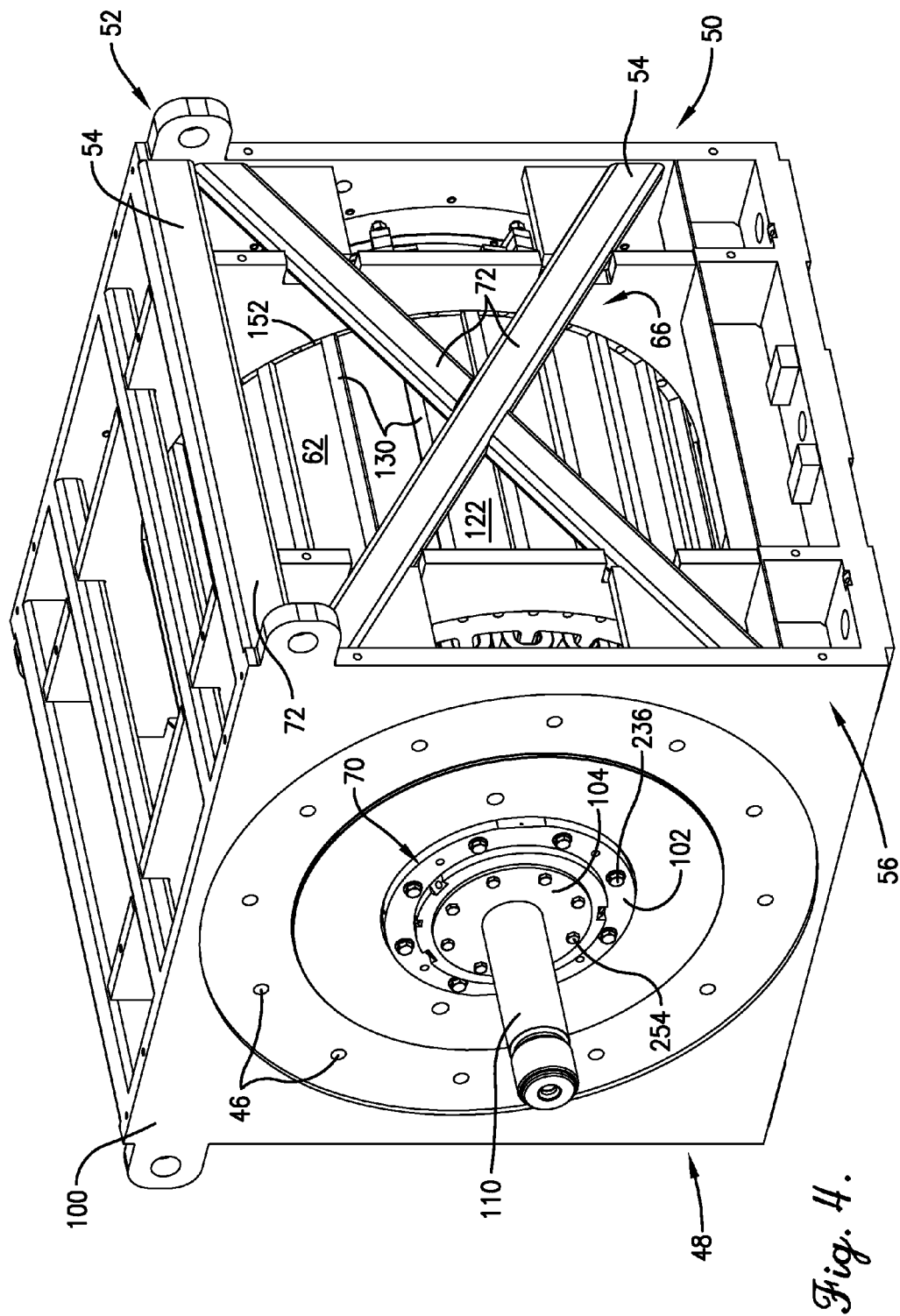
FIG. 4 is a front perspective view of the motor assembly of FIGS. 1-3, with the coolant gas system and side plates removed.
Figure 5:
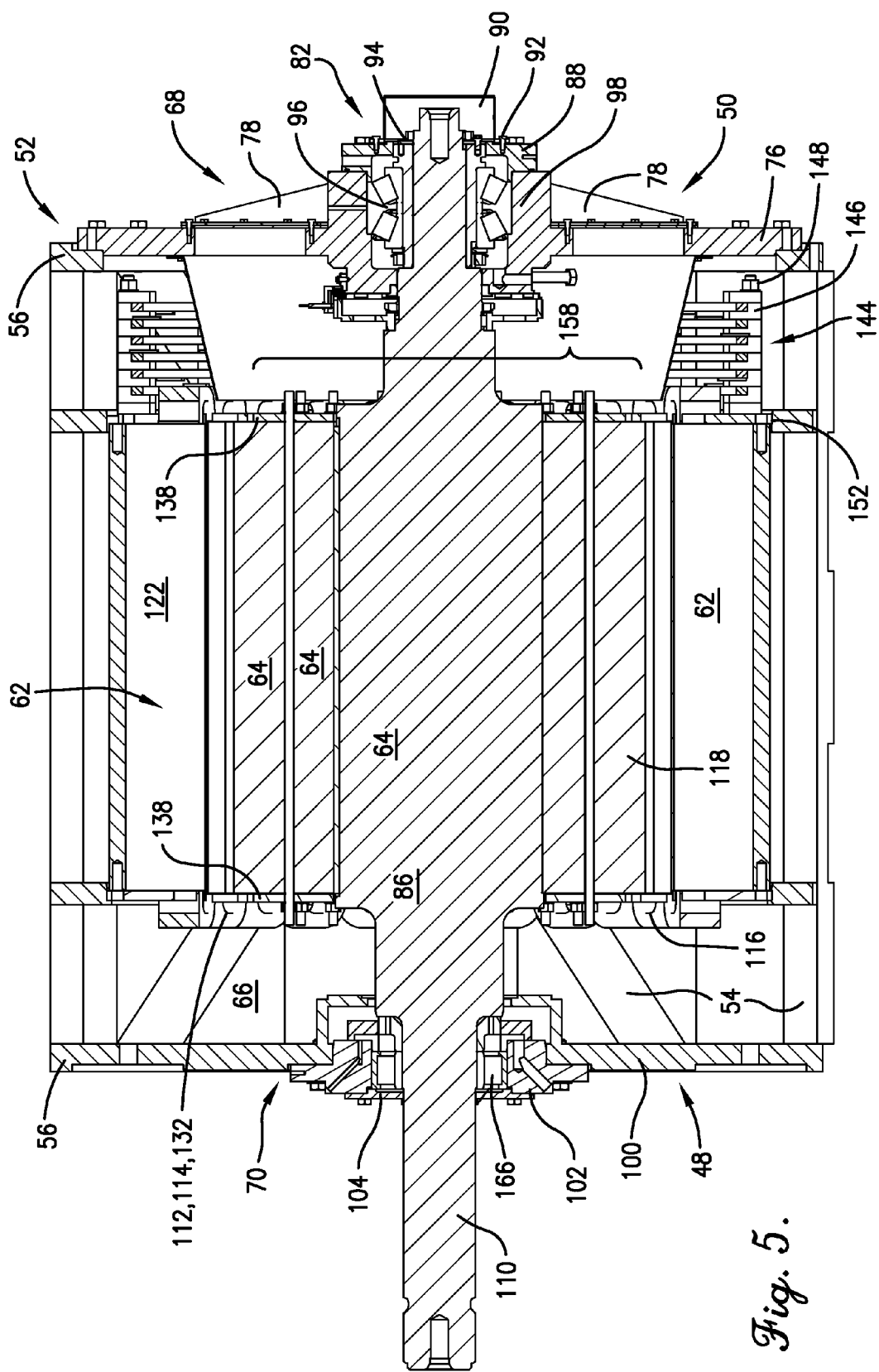
FIG. 5 is a side cross-sectional view of the motor assembly as depicted in FIG. 4.

The motor housing 56 is generally in a fixed relationship with the motor frame 54. In a preferred embodiment, the motor frame 54 and motor housing 56 are comprised of steel and are removably fixed to one another to form a single motor frame assembly 52. As illustrated in FIGS. 4 and 5, the motor frame assembly 52 substantially houses a stator 62 and a rotor 64, the stator 62 is fixed to the motor frame 54, and the rotor 64 is securely coupled to the motor frame assembly 52 for rotation relative to the stator 62. The motor frame assembly 52 further presents an internal motor chamber 66 for facilitating coolant gas circulation produced by the coolant gas system 60. The motor frame assembly 52 broadly includes a closed end plate assembly 68, a drive end plate assembly 70, interconnecting bars 72, and side plates 74.

The closed end plate assembly 68 includes an end plate 76, a closed end bracket 78, motor chamber access plates 80, and a bearing cover assembly 82. The motor chamber access plates 80 are removably attached (with fasteners 84) to the closed end bracket 78 that, when removed, presents a window 192 (described further below) that provides access to the rotor shaft 86 adjacent the closed end 50 of the motor assembly 42. The bearing cover assembly 82 includes a bearing access plate 88 and an end cap 90. The bearing access plate 88 is removably fixed to the closed end bracket 78 with at least one fastener 92, and the end cap 90 is removably fixed to the bearing access plate with at least one fastener 94. Removal of the bearing cover assembly 82 exposes the first bearing 96 and the bearing support surface 98 that securely houses the first bearing 96. The drive end plate assembly 70 includes an end plate 100, a bearing housing 102, and a bearing cover plate 104, as described in more detail below.

Turning now to FIG. 5, the motor assembly 42 broadly includes a rotor 64 and a stator 62 spaced radially from the rotor 64. The stator 62 is secured to the motor frame assembly 52 in a manner that limits rotation of the stator 62 relative to the motor frame assembly 52. The rotor 64 is rotatably coupled to the motor frame assembly 52, such that the rotor 64 can rotate relative to the stator 62 (and the motor frame assembly 52) on a central rotational axis 106. The rotor 64 and the stator 62 are both contained within the motor chamber 66 defined by the motor frame assembly 52. The motor frame assembly 52 at least substantially houses the rotor 64 and the stator 62. A rotor drive shaft 110 projects axially outwardly relative to the drive end 48 of the motor assembly 42 to suitably provide driving power to the centrifugal pump 44, as will be readily understood by one of ordinary skill in the art upon review of this disclosure.

The motor assembly 42 has an electromagnetic drive system operable to drive rotation of the rotor. Generally, the electromagnetic drive system 112 includes a plurality of magnets and/or electromagnets 114 on or in the rotor 64 and stator 62 and arranged so electromagnetic forces can be produced by the drive system 112 to drive rotation of the rotor 64 relative to the stator 62. In the illustrated embodiments, the stator 62 utilizes large stator coils or windings 116 to generate electromagnetic fields. Various electromagnetic drive systems can be used within the scope of the invention. Electromagnetic drive systems are well-known in the art and will not be discussed in further detail herein.

Stator

The motor assembly 42 of this embodiment is generally made in relatively large sizes, e.g., from about 40,000 lb. to 50,000 lb. in weight, and suitable for use with slurry pumps. In this embodiment, the motor assembly 42 may include a stator core weighing in the range of about 10,000 lb to 15,000 lb. The need to operate a motor in slurry pump applications requires motor components that are adapted to handle relatively high torquing forces. As such, the motor assembly of this embodiment may be rated at about 1.5 MW at 400 RPM.

Figure 6:
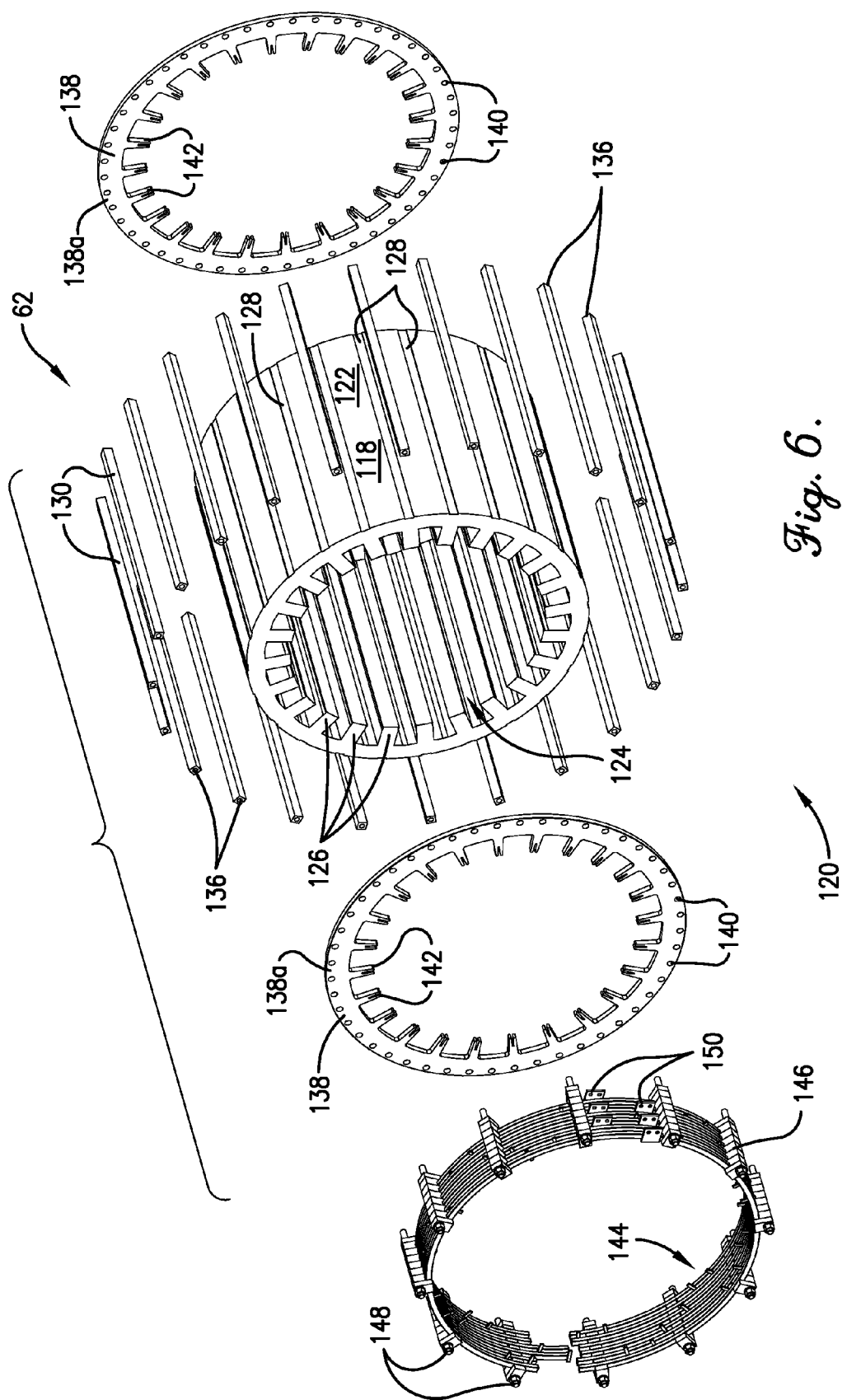
FIG. 6 is an exploded front perspective view of the stator of the assembly of FIGS. 4-5, with the stator coils and windings removed.
Figure 7:
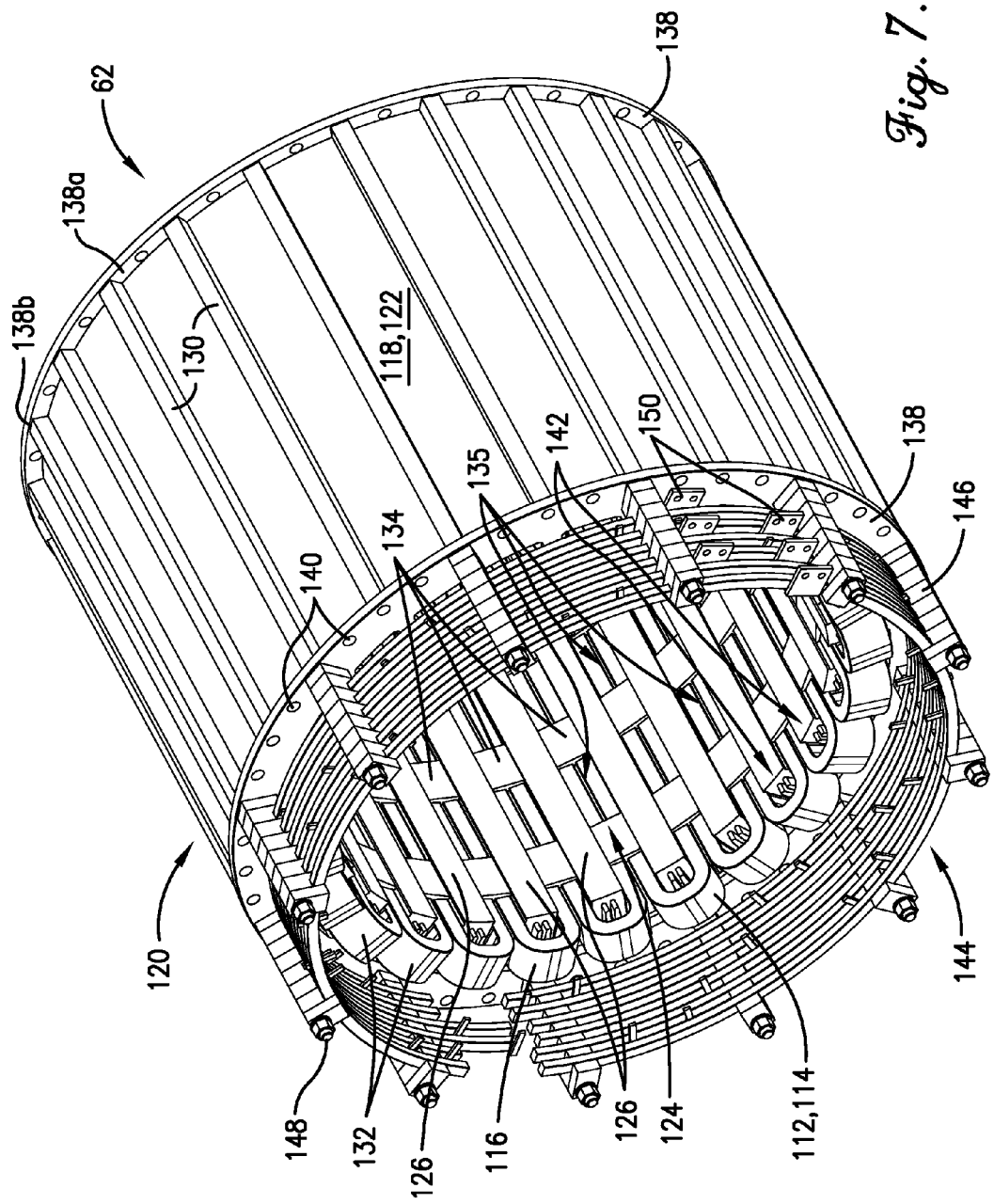
FIG. 7 is a front perspective view of the stator of the assembly of FIGS. 4-5.

In the illustrated embodiment, the stator 62 generally includes a stator core 118, a plurality of coils or windings 116 supported in the stator core 118, and a stator cage 120. The stator core 118 preferably includes a stack of laminations 122, although a monolithically formed stator core is permissible according to some aspects of the present invention. A central opening 124 preferably extends through the laminations 122. The stator core 118 thus preferably presents both inner and outer radial core margins. The central opening 124 preferably receives the rotor 64, such that the motor is an inner rotor motor. It is permissible according to some aspects of the present invention, however, for the motor to be an outer rotor motor. The central opening 124 is preferably concentric with the laminations 122. Turning now to FIGS. 6 and 7, the stator core 118 of this embodiment is generally cylindrical as shown, so as to have a stator core outer diameter, though other shapes are contemplated. Elements of the stator core 118 may be made of any ferromagnetic material, including powdered metal, among other possible materials. The laminations provide a plurality of circumferentially spaced apart pole segments 126 preferably projecting inwardly (in keeping with the preferred inner rotor embodiment) into the central opening 124. In the illustrated embodiments, the laminations 122 provide a series of corresponding recessed areas 128 for receiving bars 130 that are in radial alignment with the stator core pole segments 126.

The stator coils or windings 116 present end turns 132 at opposite axial ends of the stator core 118. The stator coils or windings 116 are secured to the lamination stack 122 through a series of stator coil or winding retention devices 134. The stator presents a plurality of circumferentially spaced slots 135 extending along the axial length thereof, each of which is defined between an adjacent pair of pole segments 126. The stator coils 116 are wrapped around the pole segments so as to be generally located within the slots 135. Various techniques and devices that are well known in the art can be used to arrange and mount the stator coils or windings 116 to the stator core 118. Thus, these techniques and devices will not be described in any further detail.

Because the stator 62 is intended for use in large motor applications, the stator cage 120 is provided to securely interconnect the laminations 122 and to provide structure to facilitate lifting and manipulation of the stator 62. The stator cage 120 preferably includes a plurality of bars 130 that extend generally axially along the outer surface of the laminations 122. The bars 130 preferably present axial bores 136 on at least one end thereof and, more preferably, bores at each of the ends. Preferably, at least some of the bores 136 are threaded to receive a threaded fastener, as will be explained. The bars 130 are received in the recessed areas 128, eliminating the likelihood of relative rotation between the stator core 118 and stator cage 120.

Stator end plates 138 are preferably but not necessarily of a generally toroidal shape so as to present end plate outer diameters. The stator end plates 138 are preferably concentrically disposed at the opposite ends of the stack of laminations 122. The stator end plates 138 present a plurality of circumferentially spaced openings 140 near the outer edge, with some of the openings 140 corresponding to the axial bores 136 of the stator cage bars 130.

Preferably, a portion 138a of each stator end plate 138 extends radially beyond the outer radial core margin. Most preferably, as illustrated, such portion 138a extends at least substantially continuously circumferentially so as to be generally annular in form. (Thus, in a preferred embodiment, the end plates 138 have a larger diameter than the stator core 118). The openings 140 are preferably defined by the respective end plate portions, such that the openings are positioned radially beyond the outer radial core margin. It is particularly noted that, although extension and positioning beyond the outer radial core margin is preferred, additional or alternative extension and/or positioning beyond the inner radial core margin is also permissible according to some aspects of the present invention.

As noted previously, in a preferred embodiment, the stator core 118 and, in turn, the outer radial core margin, is preferably generally cylindrical (i.e., generally circular in cross-sectional shape). Similarly, the end plates 138 are preferably generally toroidal, with the end plate portions 138a thus being generally circularly annular. It is reiterated, however, that non-circular/cylindrical/annular forms are permissible as well. Preferably, regardless of shape, a portion of each of the end plates extends beyond the outer core margin. That is, in non-circular/cylindrical/annular embodiments, the corresponding outer dimensions of the stator core and the end plates are of importance. For instance, the end plate might be in the form of a square having a greater side dimension than the diameter of a cylindrical core, so as to present a continuously extending outer end plate portion, or the end plate and the core might both have equal-sized octagonal cross-sections but be rotated relative to each other such that eight (8) discrete corners of the end plate project past respective ones of the eight (8) straight sides of the core. It is noted that such non-circular outer perimeters are particularly feasible in conjunction with the preferred inner rotor design.

The ends of the bars 130 each preferably abut respective ones of the stator end plates 138. Preferably, the stator end plates 138 and bars 130 are fixedly secured to one another. In this embodiment, the bars 130 are skip welded on each side to the laminations 122 and also welded at the ends to each end plate 138. Various techniques may be suitable for fixedly securing the stator cage 120 components to one another while staying within the scope of the invention.

Figure 8:
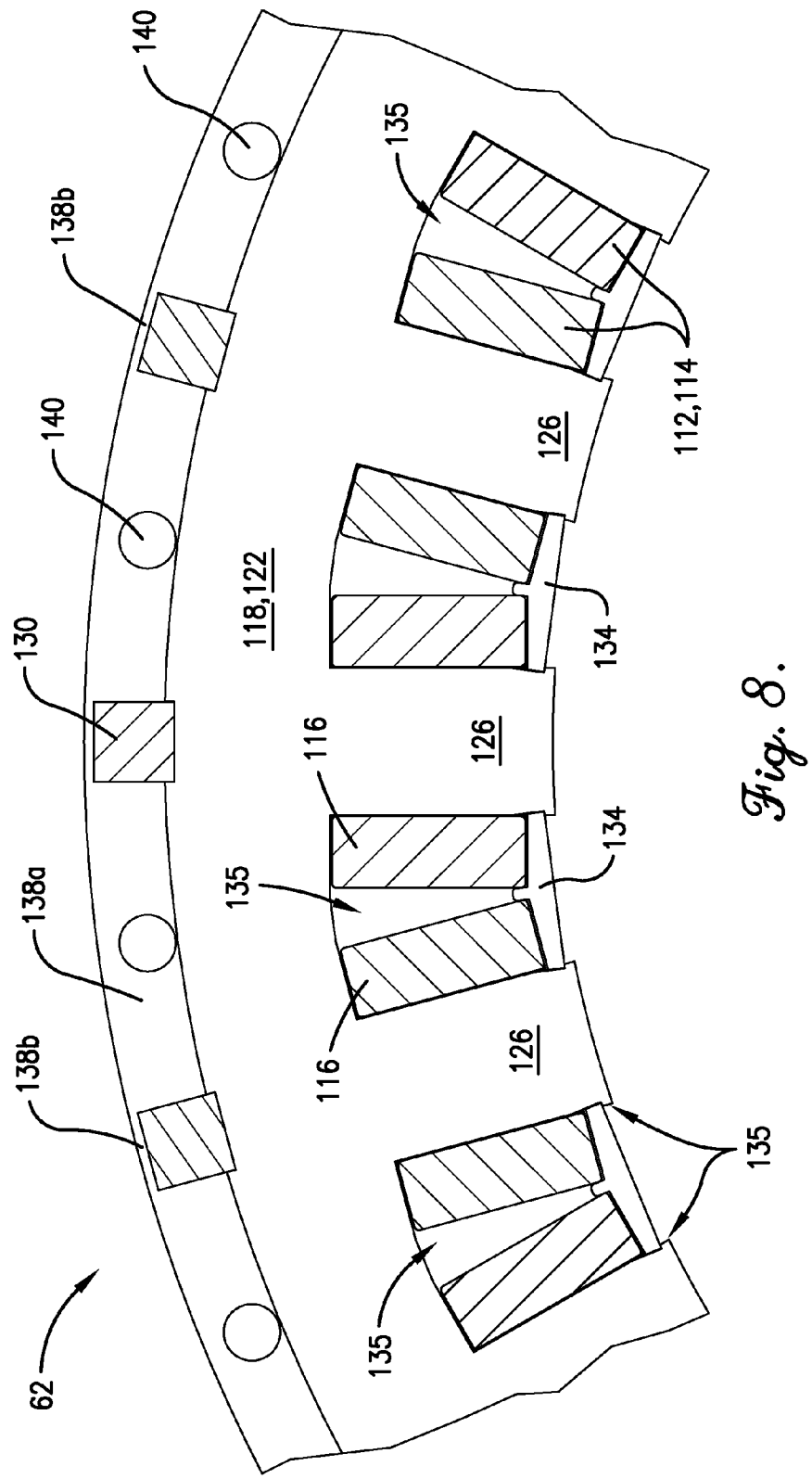
FIG. 8 is an enlarged cross-sectional front view of the stator of FIG. 7.

Preferably, each stator end plate 138 presents a radially outermost end plate margin. Furthermore, each bar 130 preferably presents a generally axially extending radially outermost bar margin. As shown in FIG. 8 and others, the radially outermost end plate margins are each preferably spaced radially outside the radially outermost bar margins. That is, a part 138b of each end plate portion 138a preferably extends radially beyond the outer radial bar margins.

As illustrated, the end plates 138 present a series of teeth 142 that preferably project radially inward (in keeping with the preferred inner rotor embodiment) and overlay the axial ends of the lamination poles 126, providing extra security to the laminations 122 and further preventing lamination flaring. The teeth 142 are forked to assist with heat dissipation associated with the lamination pole segments 126, although the teeth 142 may present various configurations without departing from the scope of the present invention.

Preferably, at least some of the circumferentially spaced openings 140 in the stator cage end plates 138 can be used to facilitate lifting of the stator 62. However, it is within the scope of the invention to consider other potential uses for the openings 140. For example, some of the circumferentially spaced openings 140 in the stator cage end plates 138 in alignment with the stator cage bars 130 can provide mounting points for various motor components. The aligned bores 136 and openings 140 may alternatively be used to facilitate lifting and manipulation of the stator. Yet further, any openings 140 in the end plates 138 not aligned with a corresponding bore 136 may also be used to facilitate lifting and manipulation of the stator. If the exposed bore is threaded, a threaded lifting clevis (or other suitable connector) can be coupled to the bore 136.

In the illustrated embodiment, a series of buss rings 144 are arranged in axial alignment relative to one end of the stator core 118. Preferably, the buss rings 144 are fixedly coupled to one another with a plurality of circumferentially spaced insulated brackets 146. Each bracket 146 preferably presents an opening (not shown) that receives a fastener 148. The fastener 148 extends through the buss ring bracket 146, through a respective one of the openings 140 of the stator cage end plate 138, and secures into the axial bore 136 of the corresponding bar 130, fixedly coupling the buss rings 144 to the stator cage 120. Each buss ring 144 includes a tab 150 that serves as a power lead for pulling a current from wires (not shown) connected to the main power component 58, in turn, providing power using wires (not shown) directed to the stator coils or windings 116. In a preferred embodiment, the buss rings 144 and tabs 150 are comprised of a conductive material, such as copper.

Turning now to FIG. 7, the fully assembled stator 62 includes the stator core 118, stator cage 120, stator coils or windings 116, and buss rings 144. Although the illustrated embodiment includes buss rings 144, other forms of power leads to the stator coils or windings 116 may be considered without departing from the teachings of the present invention.

Figure 9:
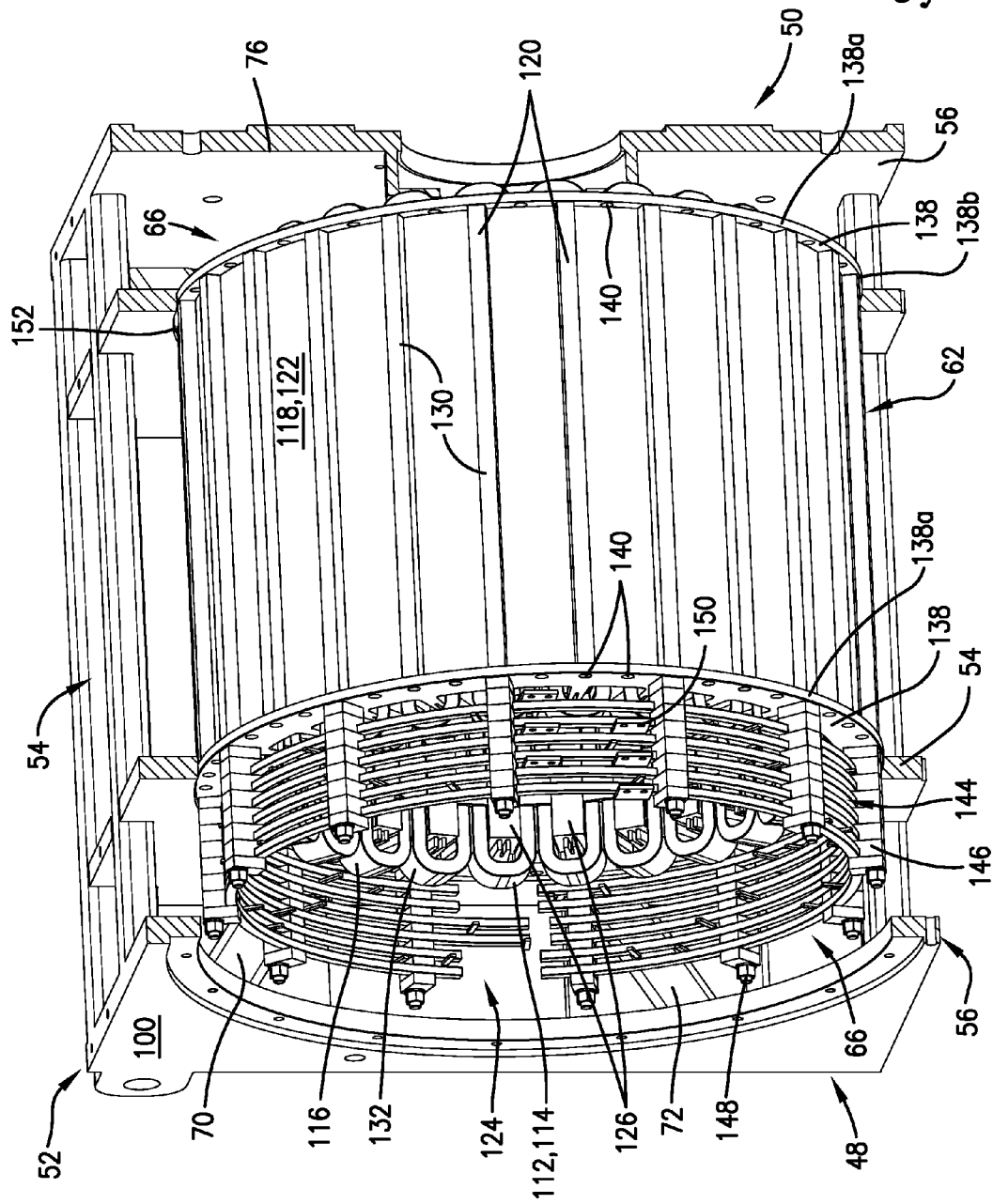
FIG. 9 is a front perspective view of the stator of FIGS. 4-5, and 7, within a fragmentary cross-sectional view of the motor frame assembly of FIGS. 1-4.

Referring now to FIG. 8, once again illustrating the stator cage 120 in an assembled state, the outer circumference of the stator cage end plates 138 are slightly larger than the outer circumference defined by the stator cage bars 130. The outer circumference defined by the stator cage end plates 138 provide for fit placement of the stator 62 into the motor frame 54, as illustrated in FIG. 9. The motor frame 54 includes a circumferential support surface 152 for receiving the stator 62 and supporting the stator 62 by engaging the stator cage end plates 138. Preferably, the stator cage 120 is fixedly secured to the motor frame 54. Various techniques and structures well-known in the art are suitable for fixedly securing the stator cage 120 to the motor frame 54. Thus, securing the stator cage 120 to the motor frame 54 will not be discussed in any further detail herein.

Coolant Gas Diverter Plate

Referring back to FIGS. 2 and 3, as is somewhat conventional and readily appreciated by one of ordinary skill in the art, the motor assembly 42 includes a coolant gas system 60 preferably having a heat exchanger. In the illustrated embodiment, the coolant gas system 60 includes an external coolant (preferably gas) circuit, wherein external coolant gas is drawn through an external coolant gas intake 154, passed through the heat exchanger, and released through a coolant gas exhaust 156. The coolant gas system 60 also includes a closed internal coolant gas circuit, wherein internal coolant gas is circulated between the motor chamber 66 and the heat exchanger, such that heat from the internal coolant gas is absorbed by the external coolant gas, and released. The structure and operation of the heat exchanger may be generally conventional in nature and need not be described in further detail here. Furthermore, if desired, the gas coolant system 60 may be alternatively configured without departing from the spirit of the invention. For example, the heat exchanger may be eliminated altogether, such that the coolant (e.g., ambient air) is passed directly through the motor chamber.

It is known that electric motors often generate a significant amount of heat that must be dissipated. The coolant gas system 60 is operable to produce a fluid flow of coolant gas through the rotor 64 and stator 62 from a first end to a second end, and return coolant gas to the heat exchanger for heat dissipation and recirculation. In the illustrated embodiment, the coolant gas is circulated between the closed end 50 of the motor chamber 66, to the drive end 48 of the motor chamber 66, to the heat exchanger, then recirculated. Preferably, the coolant gas system 60 is an air-to-air exchanger, though other heat exchangers and coolant systems are within the scope of the present invention.

With brief reference back to FIG. 5, the rotor 64 includes a rotor core 158 having a central shaft opening 160 extending through the laminations 162 and end plates 164, and receiving a rotor shaft 86 with a first and second bearing 96, 166 mounted thereon. The rotor shaft 86 is rotatably coupled to the motor frame assembly 52. As in the illustrated embodiment, the rotor shaft 86 is supported on each end with the bearings 96, 166 securely coupled to the motor frame assembly 52. The rotor 64 is coupled in a manner that allows the rotor 64 to rotate relative to the stator 62 on a central rotational axis.

Figure 10:
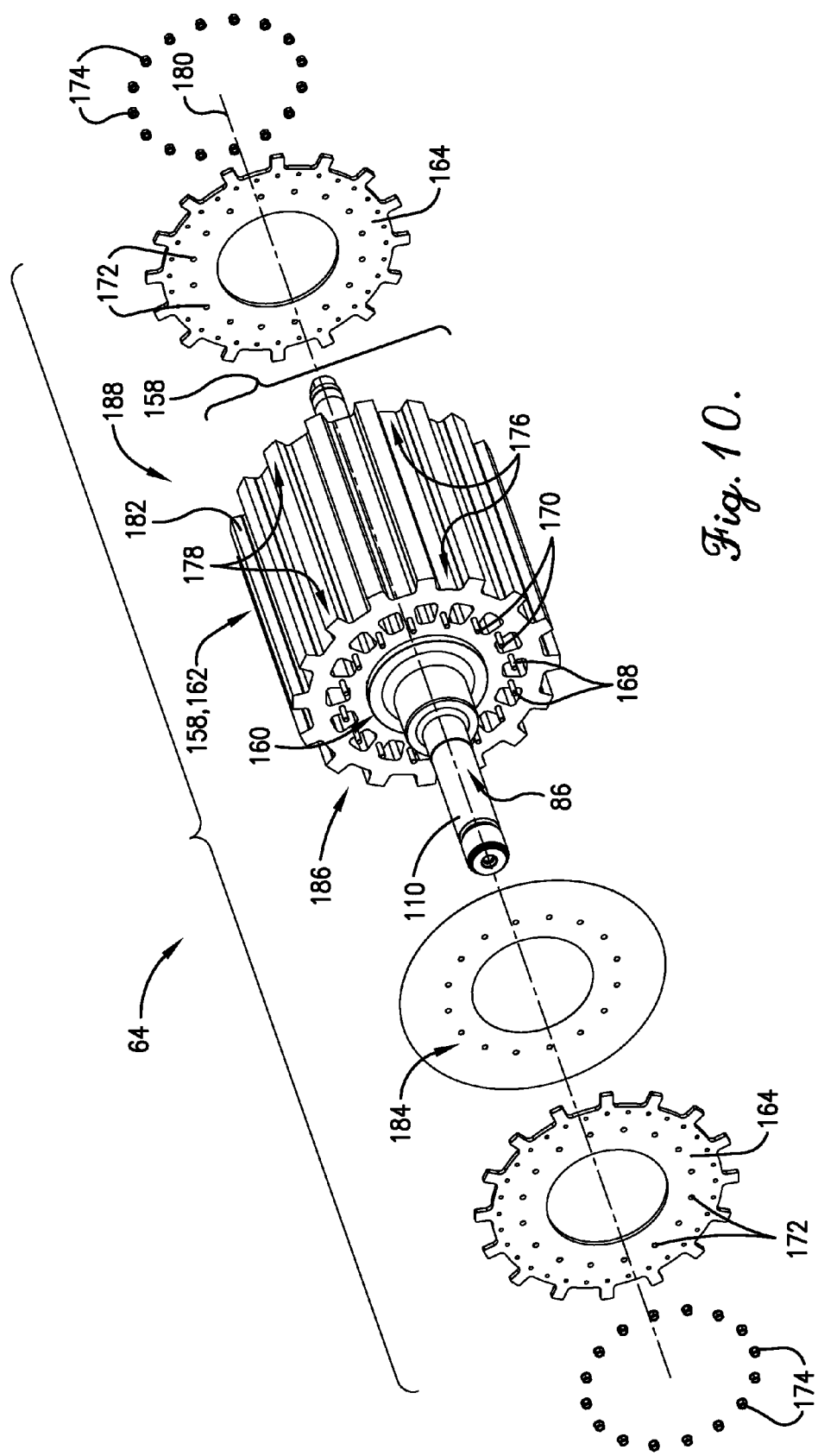
FIG. 10 is an exploded front perspective view of the rotor of the assembly of FIGS. 1-2 and 4-5.

Turning now to FIG. 10, the rotor core 158 includes a stack of laminations 162. End plates 164 are concentrically disposed at opposite ends of the stack of laminations 162. A central shaft opening 160 extends through the laminations 162 and end plates 164, and receives the rotor shaft 86. The central shaft opening 160 is concentric with the laminations 162. The rotor core 158 of this embodiment is generally cylindrical as shown, though other shapes are contemplated. Elements of the rotor core 158 may be made of any ferromagnetic material, including powdered metal, among other possible materials. The rotor core 158 may be made of stacked individual stampings or laminations.

The laminations 162 include a plurality of coaxial fastener holes extending therethrough (not shown). Each of the lamination holes receives one of a plurality of stainless steel pins 168. A head 170 of each pin 168 contacts one of the end plates 164, and the end plates 164 may include counterbores 172 as shown to receive each head 170. Each pin 168 extends all the way through the rotor core 158 and protrudes from the other end of the plates 164. Each pin 168 of this embodiment has spaced-apart, circumferential grooves near its end (not shown). The portion of the pin 168 protruding from the plate 164 has the grooves thereon. One of the plurality of stainless steel collars 174 is received over and engages one of the pins 168, the pin 168 and collar 174 being a locking fastener set of this embodiment. The collar 174 also contacts the end plate 164. As will be appreciated by one of ordinary skill in the art, the end plates 164 can use various methods of attaching to the rotor core 158 that are within the scope of the invention.

The rotor core 158 is designed to allow coolant gas to flow from the closed end 50 of the motor chamber 66 to the drive end 48 thereof. More particularly, the outer diameter of the core 158 includes a plurality of axially extending coolant gas passages 176 alternately arranged with a plurality of circumferentially spaced apart pole segments 178. The coolant gas passages 176 extend axially along the circumference of the rotor 64. In the illustrated embodiment, each of the coolant gas passages 176 is spaced equally about the same distances from the rotor axis 180. Each coolant gas passage 176 is a separate coolant gas passage 176 and is substantially parallel to the rotor axis 180. In a preferred embodiment, each pole segment edge 182 maintains a substantially orthogonal relationship to its adjacent coolant gas passage 176, respectively. However, pole segments 178 and coolant gas passages 176 of varying constructions and arrangements are within the scope of the present invention.

Figure 11:
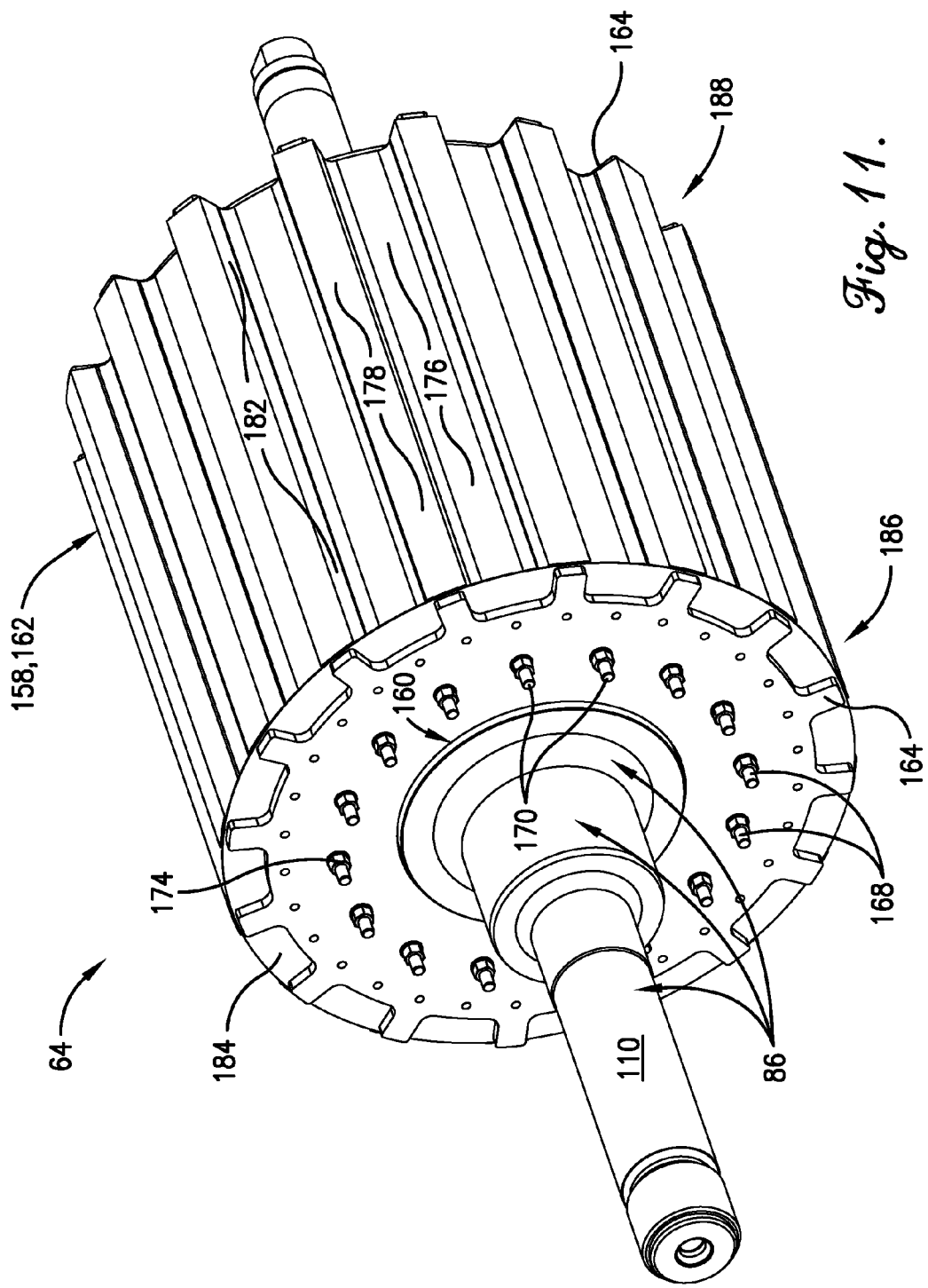
FIG. 11 is a front perspective view of the rotor of FIG. 10.

When the coolant gas is circulated by the coolant gas system 60, coolant gas is at least directed through the closed end 50 of the motor chamber 66, directed through the motor chamber 66 between the stator 62 and the rotor 64, and dispersed outwardly relative to the drive end 48 of the motor chamber 66. In the illustrated embodiment, a coolant gas diverter plate 184 is mounted coaxially to the rotor 64 so that the rotor axis 180 coincides with the axis of the diverter plate 184. The diverter plate 184 is positioned axially between the drive end 48 of the rotor core 158 and the end plate 164. The diverter plate 184 is suitably secured to the rotor core 158 and end plate 164 so that they all rotate as a singular body, as illustrated in FIG. 11. The diverter plate 184 presents a diameter that is at least greater than the core diameter defined by the coolant gas passages 176. In the illustrated embodiment, the diverter plate 184 diameter is substantially equal to the core 158 diameter presented by the pole segments 178.

The diverter plate 184 is preferably a disc that is circular in shape. However, the diverter plate 184 could alternatively be segmented rather than one continuous disc. Moreover, a diverter plate 184 configured in different shapes is also within the ambit of certain aspects of the present invention. In the illustrated embodiment, the diverter plate 184 is positioned at the downstream end 186 (relative to the flow direction of the coolant gas) of the coolant gas passages 176. Therefore, in the preferred embodiment, the plate 184 redirects coolant gas radially outward toward the stator 62. The diverter plate 184 functions as a baffle or dam that forces coolant gas to disperse towards and dissipate heat from at least some stator pole segments 126, stator coils or windings 116 adjacent the stator slots 135, and end turns 132 of the stator coils or windings 116. It is also further noted that each passage 176 is open and unobstructed upstream 188 from the diverter plate 184. This preferred configuration facilitates coolant flow through the rotor 64 until it is desired to direct it radially outward toward the stator 62.

Figure 12:
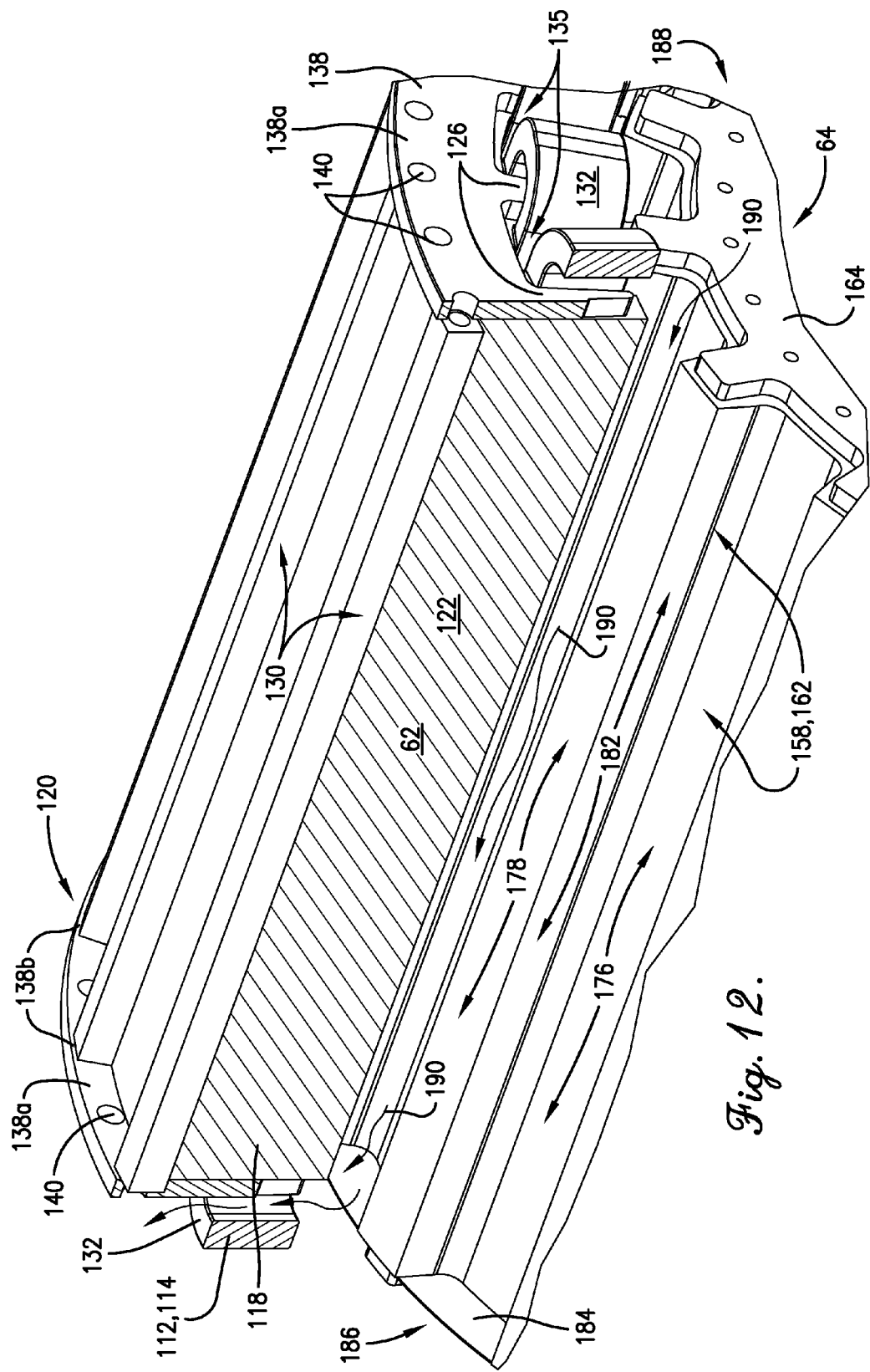
FIG. 12 is an enlarged rear perspective view of the rotor and stator FIGS. 4-5, with the flow of coolant gas illustrated.

Referring now to FIG. 12, the diverter plate 184 is positioned to divert the flow of coolant gas 186 from the coolant gas passages 176 toward the stator 62. The coolant gas 186 is forced into the motor chamber 66 by fluid flow created by the coolant gas system 60. The coolant gas 186 enters the coolant gas passages 176 of the rotor core 158 adjacent the closed end 50 of the motor chamber 66. The coolant gas 186 passes substantially parallel along the coolant gas passage 176 from the upstream end of the rotor core 188 to the downstream end of the rotor core 186. The path of the coolant gas 186 flow is then diverted by the diverter plate 184, redirecting coolant gas 186 flow radially outward relative to the rotor axis 180 to cool the stator 62.

Again, as previously noted, the principles of the present invention are applicable to alternative diverter plate designs. For example, the diverter plate 184 can comprise one or more plates of various constructions while staying within the scope of the invention. The diverter plate 184 can be in various shapes to conform with different rotor shapes. The diverter plate 184 can also be constructed with a variable diameter and radial projection angles, so as to provide various diverted flow angles from each coolant gas passage 176. The diverter plate 184 may also be alternatively designed so as not to be associated with each and every passage 176, as shown. The diverter plate 184 could also be designed for use with other coolants (e.g., a liquid coolant).

Rotor Shaft Jack

As will be readily appreciated by one of ordinary skill in the art, operation of a motor, particularly under a load, can lead to a premature breakdown of lubricants (e.g., in the bearings). Periodical maintenance may require cleaning or even the replacement of bearings to prevent interference with desired operation of the motor. As best illustrated in FIG. 5, the axial ends of the rotor shaft 86 are rotatably supported on bearings 96, 166 securely coupled to the closed end 50 and the drive end 48 of the motor frame assembly 52. In the illustrated embodiment, the rotor 64 can weigh in the range of about 10,000 lb to 15,000 lb. As can be appreciated by one of ordinary skill in the art, the removal and replacement of a bearing that supports a rotor of this weight, necessitates a means to avoid substantial deflection of the rotor from a central rotational axis. The minimization of rotor deflection, in turn, facilitates reassembly after maintenance has been completed.

Figure 13:
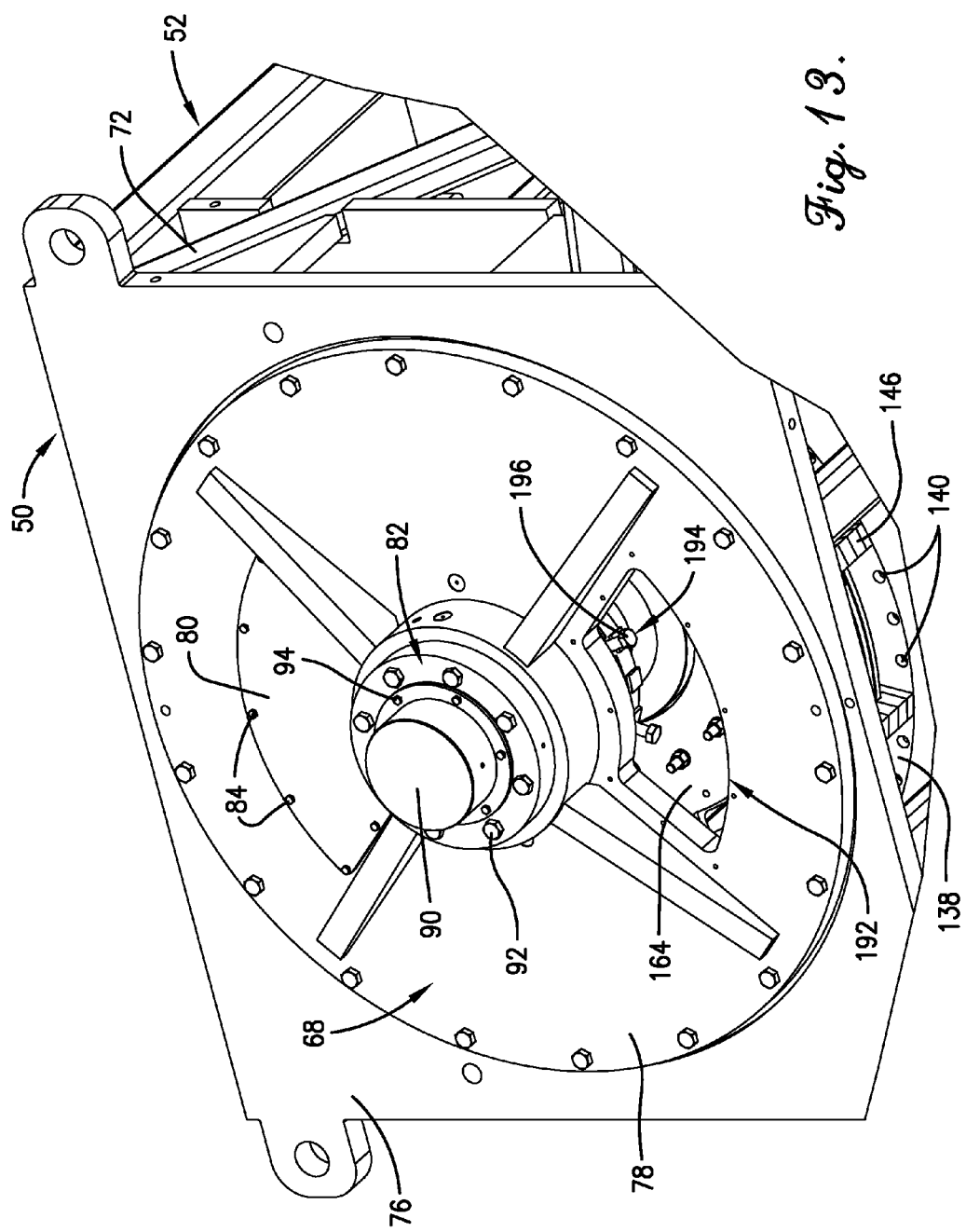
FIG. 13 is a fragmented bottom, rear perspective view of the motor assembly of FIG. 4, with one motor chamber access plate removed.
Figure 14:
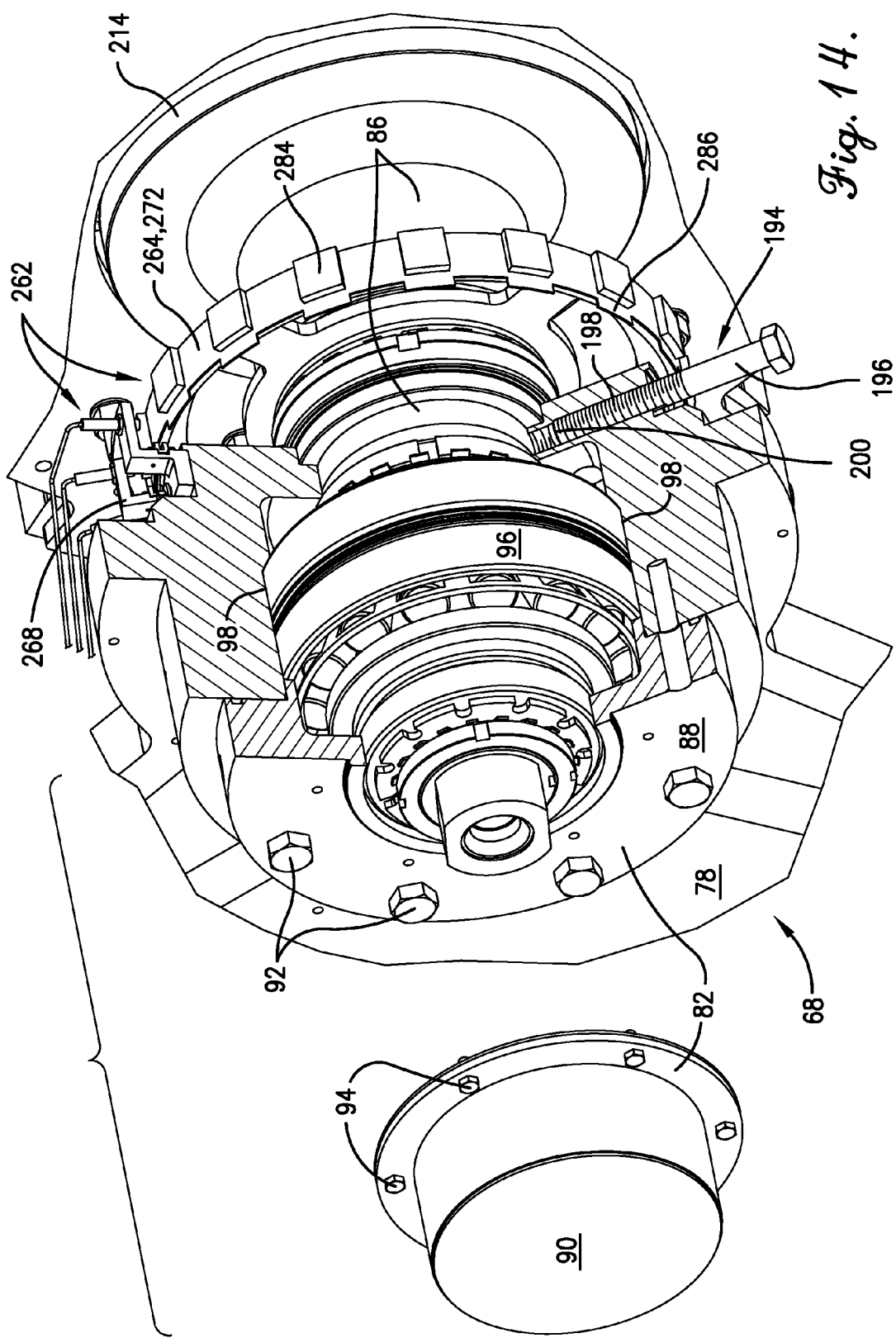
FIG. 14 is an enlarged, partially sectioned rear perspective view of the motor frame assembly, closed end bearing assembly, rotor shaft jack, and rotor sensor mechanism of the assembly of FIGS. 1-5 and 13.
Figure 15:
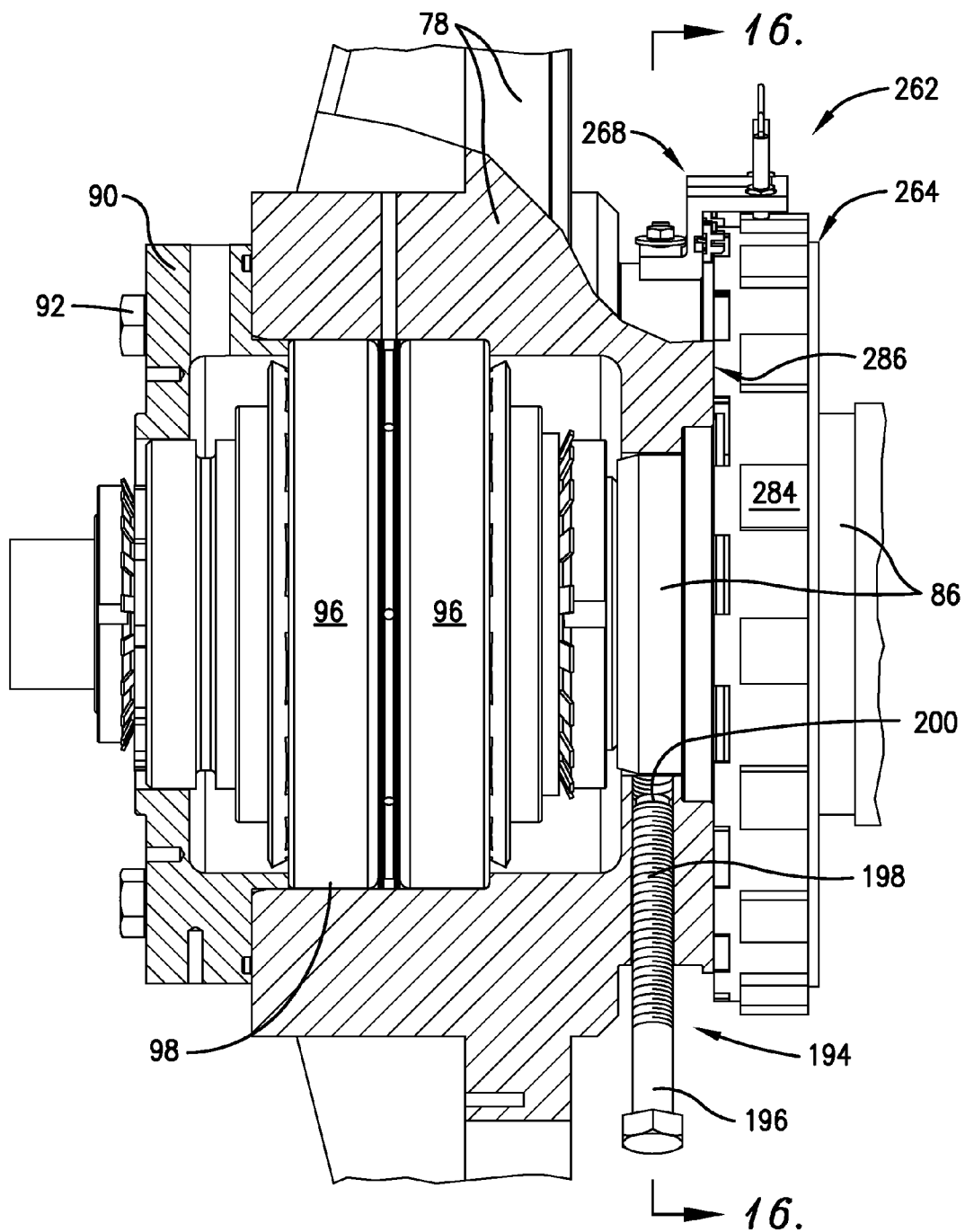
FIG. 15 is an enlarged, partially sectioned side view of the motor frame assembly, closed end bearing assembly, rotor shaft jack, and rotor sensor mechanism of FIG. 14.

As shown in FIG. 13, removal of a motor chamber access plate 80 presents a window 192 to a rotor shaft jack 194. The rotor jack 194 is shiftably coupled relative to the motor frame assembly 52 for movement between a rotor-supporting position and a retracted, non-supporting position. As can be appreciated by one of ordinary skill in the art, a rotor shaft jacking mechanism would not need to support the rotor 64 when the rotor 64 is supported by the closed end bracket 78, and thus the motor frame assembly 52. As illustrated in FIGS. 14 and 15, the jacking component 196 is in a retracted position while the bearing access plate 88 is securely attached to the closed end bracket 78. In the illustrated embodiment, the bearing 96 is securely housed within the bearing support surface 98, thereby supporting the rotor 64. The jacking component 196 preferably includes a threaded shaft 198 (e.g., a bolt) threadably engaging the closed end bracket 78, such that rotation of the shaft 198 causes axial shifting of the respective jacking component 196 between the supporting and retracted positions. Preferably, an operator accesses the jacking component 196 through the window 192 after the access plate 80 is removed, to manually screw the jacking component 196 between the supporting and retracted positions. However, the principles of the present invention are equally applicable to alternative jacking components 196 that are shifted between the supporting and retracted positions. For example, the jacking components 196 could be hydraulic cylinders, pneumatic pistons, or electronic solenoids. Further, although illustrated, the jacking component 196 is manually rotated to cause shifting of the jacking component 196 relative to the closed end bracket 78. However, the jacking component 196 could alternatively be powered (e.g., with an electric motor) while staying within the scope of some aspects of the invention.

Figure 16:
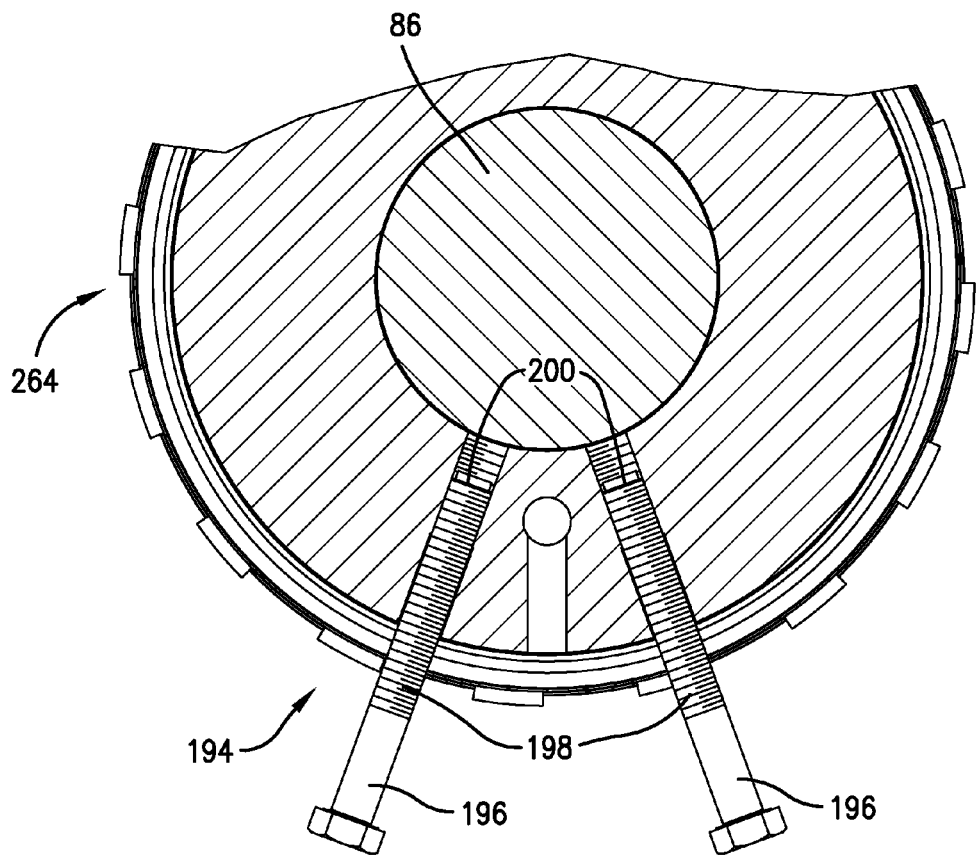
FIG. 16 is an enlarged, fragmented and partially sectioned view of the rotor and rotor shaft jack taken along line 16-16 of FIG. 15, particularly illustrating the jack in the retracted position.
Figure 17:
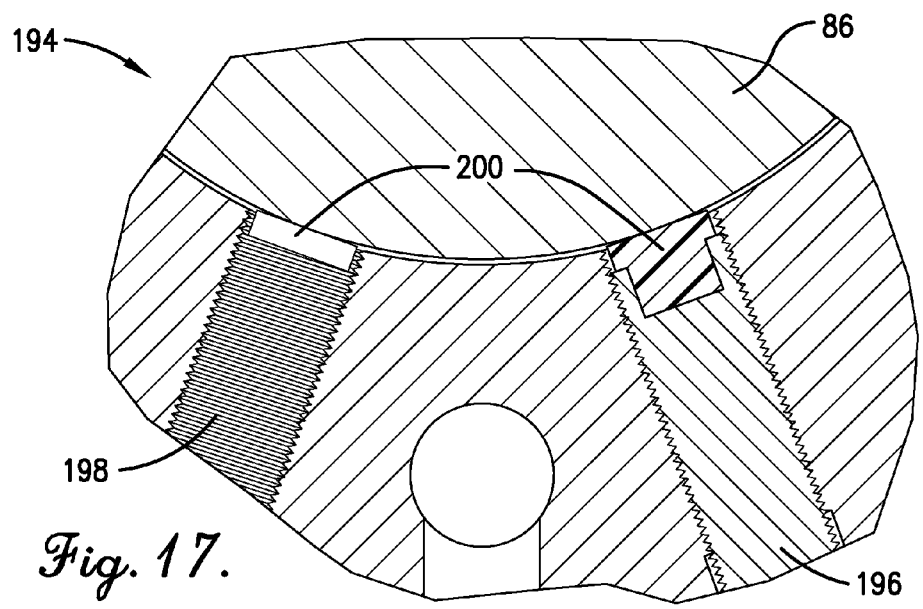
FIG. 17 is an enlarged, fragmented, and partially sectioned view of the rotor and rotor shaft jack similar to FIG. 16, but depicting the jack in the supporting configuration.

Turning now to FIGS. 16 and 17, each of the jacking components 196 has a tip 200 made of a low-friction material, preferably nylon. The low-friction tips 200 inhibit corrosion and adherence between the jacking components 196 and the rotor shaft 86. Although the low-friction tips 200 are a preferred component of the jacking components 196, it is noted that the jacking components 196 can function without the low-friction tips 200. However, other means of protecting the rotor shaft 86 may be used without departing from the scope of the invention.

With continued reference to FIG. 16, the illustrated embodiment includes a pair of threaded jacking components 196 that project radially relative to the rotor shaft 86. The jacking components 196 are angularly spaced at an angle from about thirty degrees to ninety degrees, with a preferred angle of about forty degrees. With attention now specifically to FIG. 17, the illustrated embodiment demonstrates the rotor jack 194 in a supporting position with the rotor shaft 86.

Figure 18:
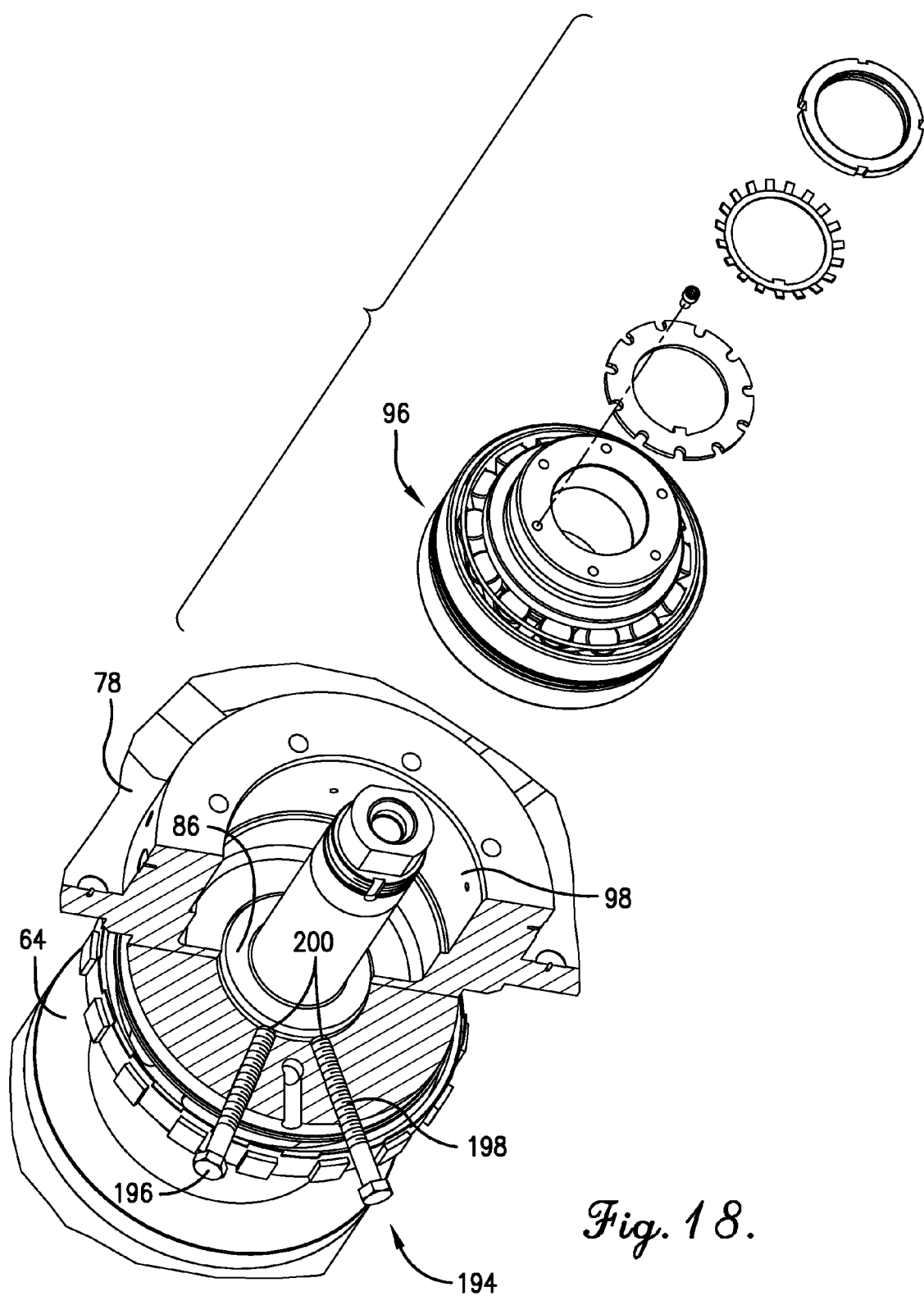
FIG. 18 is an enlarged, fragmented, partially sectioned, and exploded front perspective view of the rotor, bearing, and rotor shaft jack of FIGS. 13-17, depicting the jack in the supporting configuration and the bearing removed from the rotor shaft.

With attention now to FIG. 18, the rotor jack 194 is shifted into the supporting position such that the weight and position of the rotor 64, previously supported by the bearing 96, is subsequently shifted over to the rotor jack 194. Preferably, the rotor shaft 86 is stopped prior to shifting the rotor jack 194 into the supporting position. After the rotor jack 194 is in supporting contact with the rotor shaft 86, the bearing cover assembly 82 can be removed. In more detail, once the rotor jack 194 is in supporting contact, the bearing access plate 88 can be removed from the closed end bracket 78. If the rotor jack 194 support is sufficient enough to lift the relative rotor weight off of the bearing 96, the bearing 96 is easily removed. Once the bearing 96 is removed from the rotor shaft 86, the bearing 96 may be serviced or replaced, and subsequently reinstalled. Upon reinstallation, the jack 194 can be retracted from supporting contact with the rotor shaft 86 so that the new or serviced bearing 96 is now supporting the weight and position of the rotor shaft 86.

If desired, prior to removing the bearing 96, any suitable indicator may be used to actively or passively signal to an operator that the shaft is 86 supported for safe removal or servicing of the bearing. This will avoid excessive shaft deflection and signal to the operator that the rotor shaft 86 has been slightly lifted within the bearing tolerances. For example, a dial indicator (not shown) may be placed on the rotor shaft 86 to show when the shaft has moved into a supported condition. Once the indicator signals that the shaft 86 is supported, the bearing 96 may be removed or otherwise serviced. In another embodiment, an optical sensor (not shown) may be coupled to the motor frame assembly 52 to sense when the rotor shaft 86 has been lifted. Once the optical sensor signals that the shaft 86 is supported, the bearing 96 may be removed and serviced. In an another embodiment, a deflection limiter (not shown) may be fixed to the motor frame assembly 52. For example, the limiter may be positioned above and in close proximity to the rotor shaft 86, such that lifting of the rotor shaft 86 is limited to a height defined by the limiter. As such, once vertical movement of the rotor shaft 86 is stopped by the limiter, further rotation of the jacking components 196 is resisted, indicating to the operator that the shaft 86 is supported, such that the bearing 96 may be removed and serviced.

Tapered Bearing Housing

Turning now to the drive end 48 of the motor assembly 42 shown in the illustrated embodiment of FIG. 5, the drive end 48 of the rotor shaft 86 is rotatably supported by the second bearing 166. The bearing 166 is secured within a bearing housing 102, both of which form part of a bearing assembly 202. The bearing housing 102 is interposed between the bearing 166 and motor frame assembly 52. The bearing 166 is substantially housed within the bearing housing 102, and the bearing housing 102 is releasably attached to the motor frame assembly 52 so as to be selectively secured in supporting relationship with the bearing 166 and thereby the rotor 64.

The motor frame assembly 52 presents a circumferentially extending support face 204 that extends coaxially from the central rotational axis 106. The bearing housing 102 presents an engagement face 206 that engages the support face 204 of the motor frame assembly 52. In the illustrated embodiment, the engagement face 206 faces radially outward and the support face 204 faces radially inward. However, this orientation may be reversed without departing from the spirit of the present invention.

The motor frame assembly 52 of the illustrated embodiment also includes a central housing bore 208 in which the bearing housing 102 is received, though the invention is not limited to the presence of a central housing bore 208 (particularly if the orientation of the engagement and support faces is reversed). The central housing bore 208 of the illustrated embodiment includes a shaft ring 210 that circumscribes the rotor shaft 86 in close proximity, though the shaft ring 210 being rigidly attached to the motor frame assembly 52 without a central housing bore 208 has also been contemplated. When the bearing housing 102 is in a supporting relationship with the rotor shaft 86, the shaft ring 210 is in a coaxial relationship with the rotor shaft 86, such that the rotor shaft 86 can rotate freely within the shaft ring 210.

Figure 19:
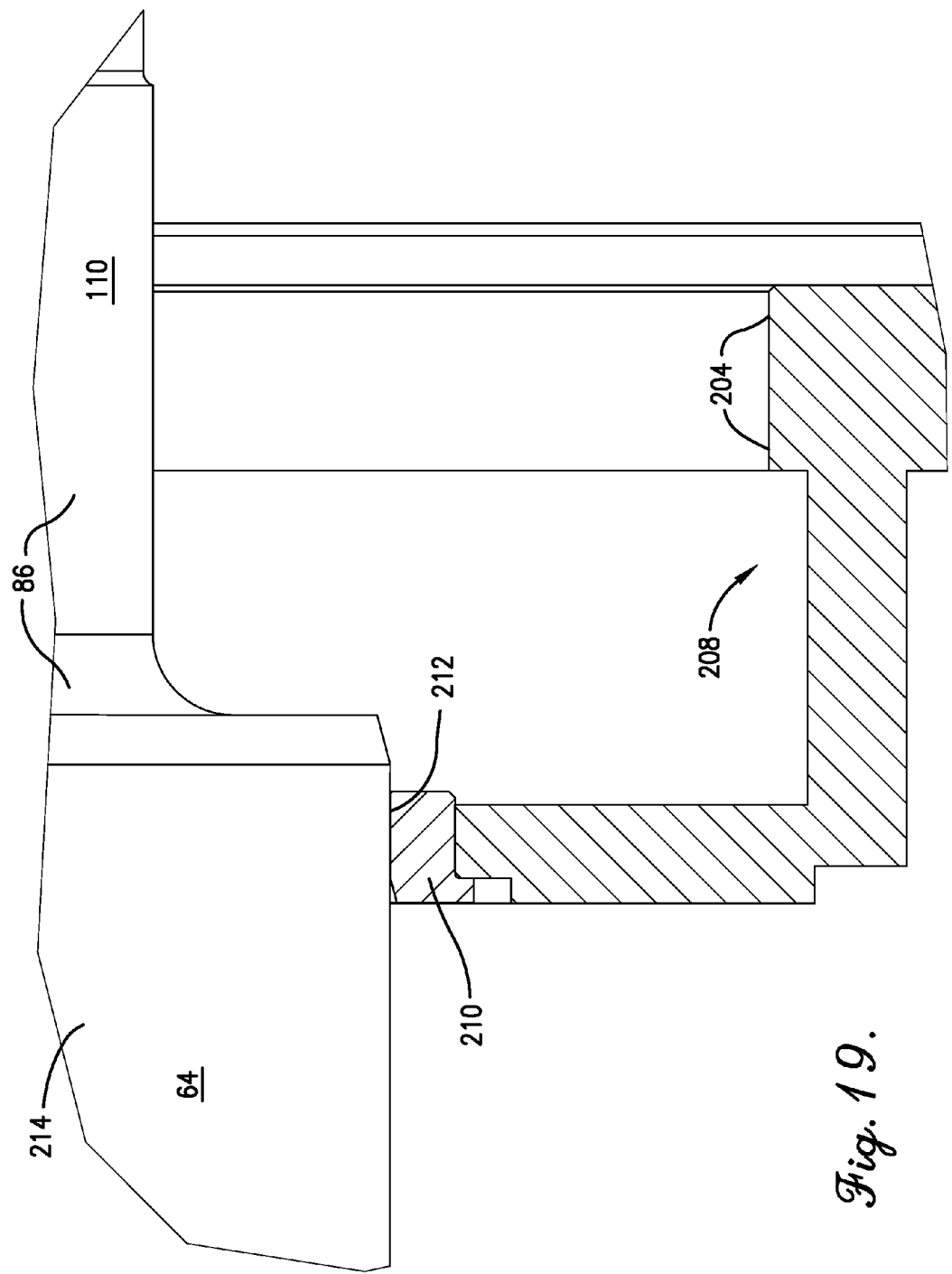
FIG. 19 is an enlarged, fragmented, and partially sectioned side view of the motor frame assembly, shaft ring, and rotor of the assembly of FIGS. 1-5, with the shaft ring in a supporting relationship with the rotor.

The shaft ring 210 has a support face 212 that engages the rotor shaft 86 when the bearing housing 102 is out of the supporting relationship. As illustrated in FIG. 19, the shaft ring 210 is in a supporting relationship with the rotor shaft 86 when the bearing housing 102 is not in such a supporting relationship. Consequently, the relative weight of the rotor 64 is supported by the motor frame assembly 52. As further illustrated in FIG. 20, the shaft ring 210 is in close proximity to the circumference of the rotor shaft 86, such that once the bearing housing assembly 202 is taken out of supporting relationship, the shaft ring 210 minimizes the deflection of the rotor axis 180 from its central rotational axis 106. Preferably, the radial gap between the shaft ring 210 and the rotor shaft 86 is less than one-tenth ($1/10$) and, more preferably, one-one hundredth ($1/100$) the rotor shaft diameter at the axial location of the ring 210. This is particularly desirable in large motor applications where the significant rotor weight could cause motor damage if one end of the rotor 64 is left unsupported.

Figure 21:
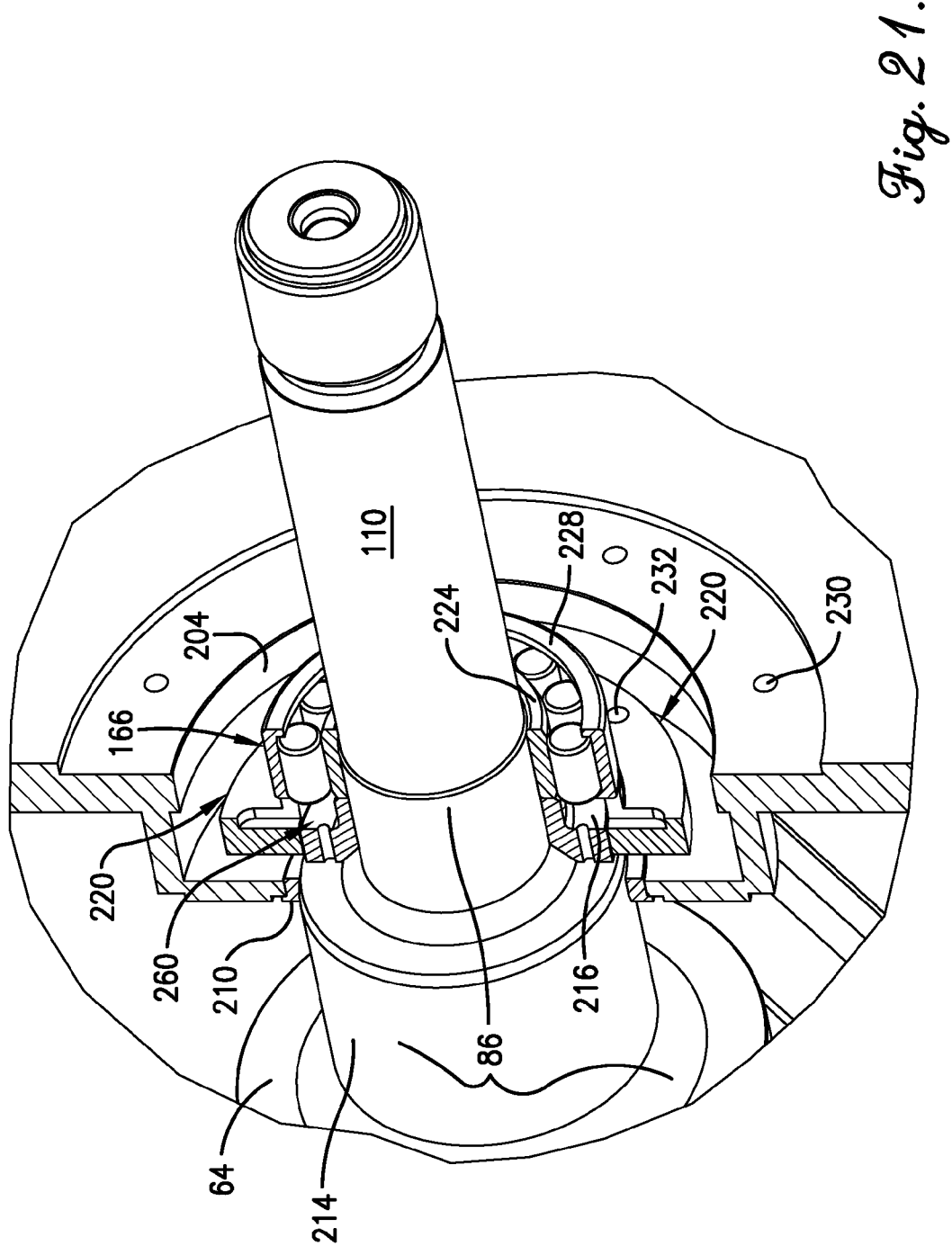
FIG. 21 is a front perspective view similar to FIG. 20, but depicting the bearing spacer, inner bearing cap, and a bearing in an installed configuration.

In the illustrated embodiment, the rotor shaft 86 has a rotor shoulder 214 and a drive shaft 110. The rotor shoulder 214 presents a shoulder diameter that is greater than the drive shaft diameter. The drive shaft 110 is designed to project axially from the motor frame assembly 52 for driving connection with the pump 44. The bearing assembly 202 includes a toroidal bearing spacer 216 that is slidably fit onto the rotor drive shaft 110 adjacent the rotor shoulder 214 to provide a support surface 218 for the inner bearing cap 220. The bearing spacer 216 also presents a spacer inner diameter substantially equal to the drive shaft diameter, as well as a spacer outer diameter that is less than the rotor shoulder diameter. The bearing spacer 216 has an inner bearing engagement face 222 along the outer axial end of the spacer 216, such that the bearing engagement face 222 engages with the inner race of the bearing 224. The bearing assembly 202 also includes an inner bearing cap 220 that is slidably fit onto the outer diameter of the bearing spacer 216. The inner bearing cap 220 presents a bearing cap inner diameter substantially equal to the bearing spacer outer diameter, and less than the rotor shoulder diameter, such that the bearing cap 220 cannot slide beyond the axial edge of the rotor shoulder 214. The inner bearing cap 220 also has an outer bearing engagement face 226 along an axial end of the cap 220, such that the outer bearing engagement face 226 inter-engages with the outer race 228 of the bearing 166. Turning now to FIG. 21, the bearing inner race 224 is flush against the bearing spacer 216 and the bearing outer race 228 is flush against the inner bearing cap 220. As will be readily appreciated by one of ordinary skill in the art, the bearing spacer 216 and inner bearing cap 220 may be optional in various motor assembly configurations, or of different construction and configuration without departing from the scope of some aspects of the invention.

Figure 20:
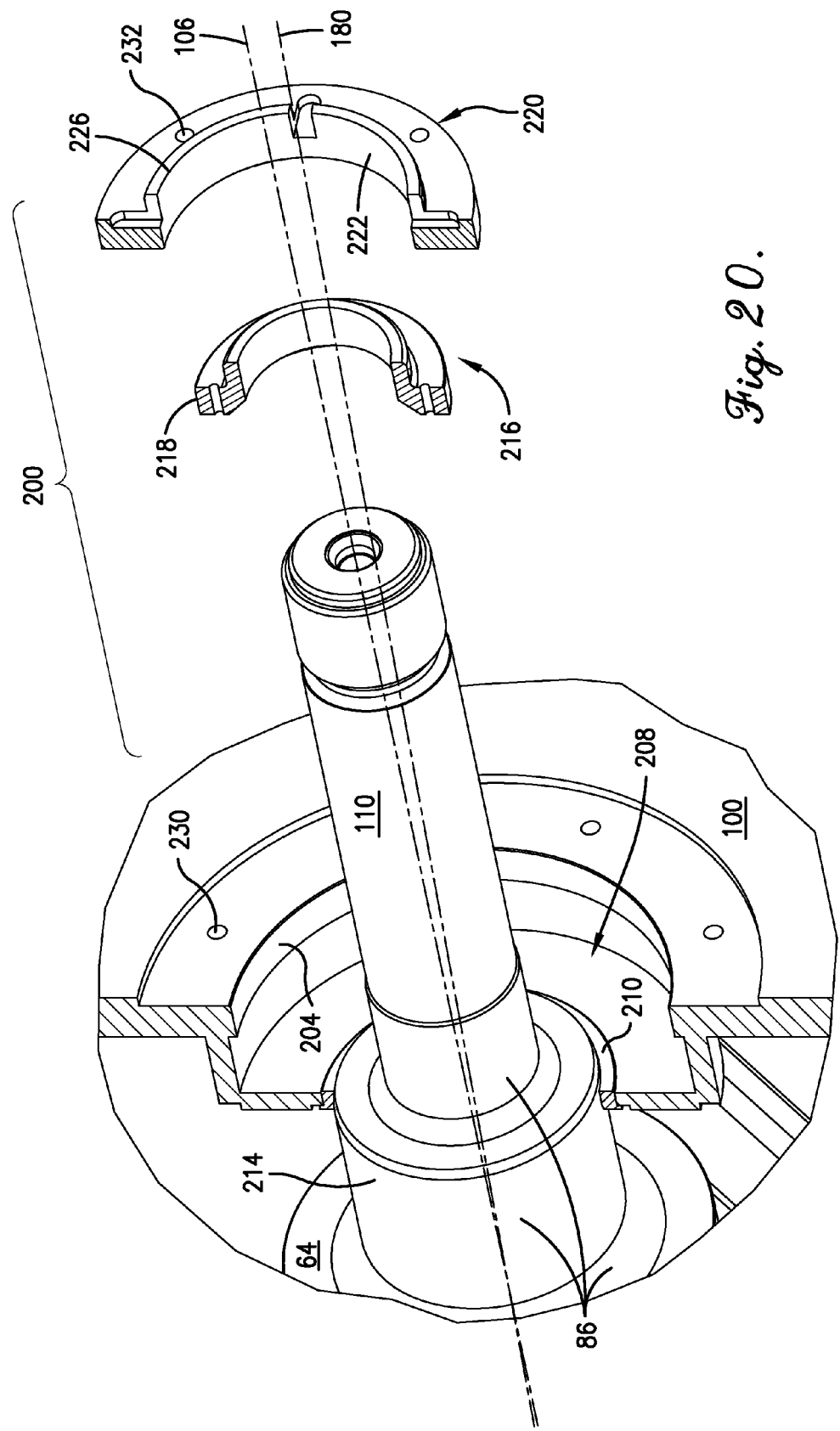
FIG. 20 is an enlarged, fragmented, partially sectioned, and exploded front perspective view of the motor frame assembly, rotor, bearing spacer, and inner bearing cap of the assembly of FIGS. 1-5, with the rotor axis deflection illustrated.
Figure 22:
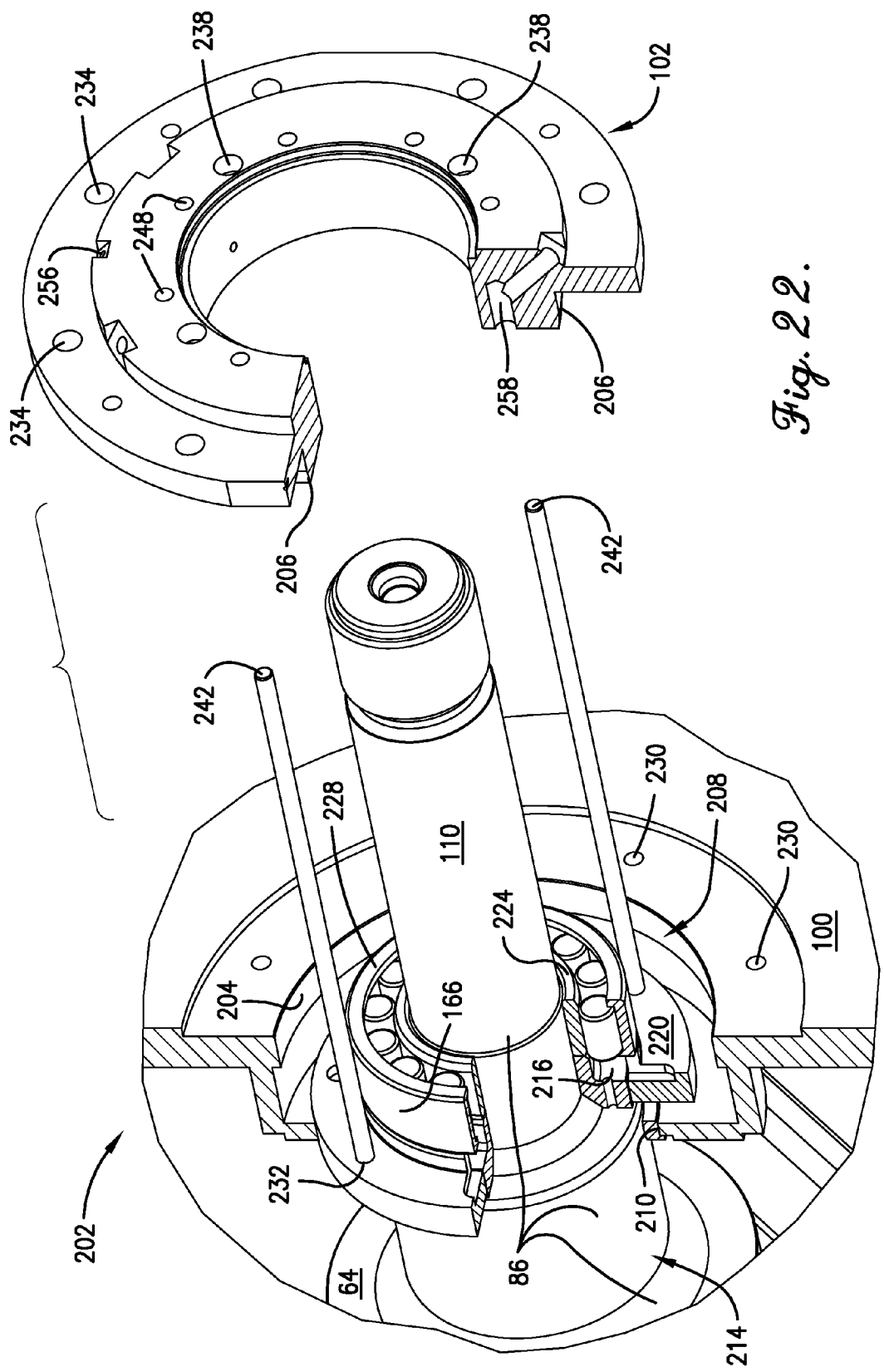
FIG. 22 is a partially sectioned front perspective view of FIGS. 20-21, with alignment studs inserted in the inner bearing cap, and the bearing housing of the assembly of FIGS. 1-5.

As shown in FIGS. 20 and 21, the drive end 48 of the motor frame assembly 52 includes a plurality of fastener-receiving openings 230 for securement of the bearing housing 102 to the motor housing 56, and thus the motor frame assembly 52. The inner bearing cap 220 also presents one or more fastener-receiving openings 232 for securement to the bearing housing 102. Turning to FIG. 22, the bearing housing 102 includes a plurality of circumferentially spaced fastener-receiving holes 234, each for receiving a respective fastener 236 (e.g., a bolt) that is also received within the corresponding hole 230 of the motor housing 56. The bearing housing 102 also includes one or more fastener-receiving holes 238, each receiving a fastener 240 (e.g., a socket head cap screw) that is also received within the corresponding hole 232 of the inner bearing cap 220.

Figure 23:
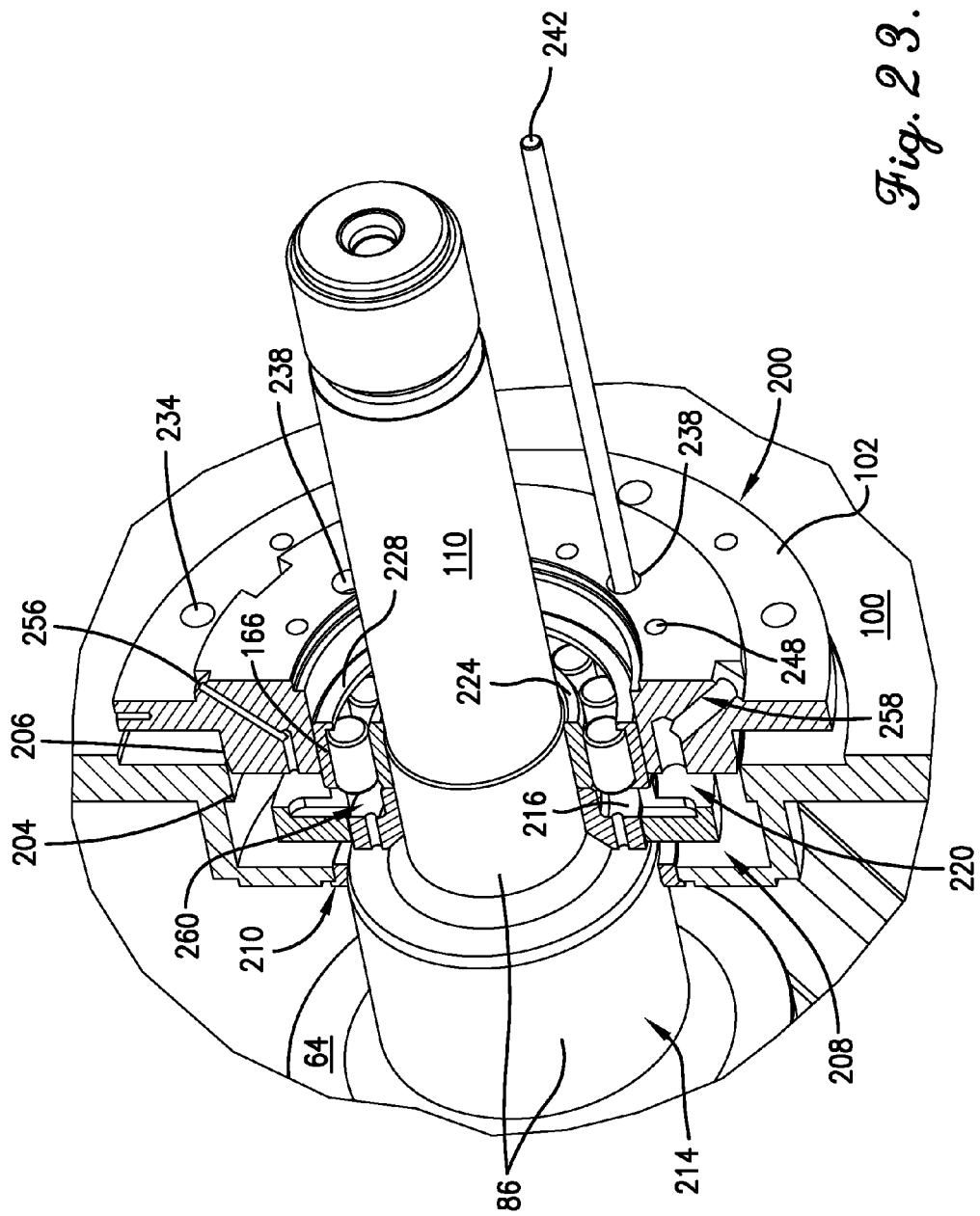
FIG. 23 is a partially sectioned front perspective view similar to FIG. 22, particularly illustrating the bearing housing engaging the motor frame assembly.

In the illustrated embodiment, alignment studs 242 are temporarily placed into respective ones of the fastener-receiving openings 232 of the inner bearing cap 220. The alignment studs 242 provide assistance in maintaining axial alignment between the fastener-receiving holes 238 of the bearing housing to the corresponding holes 232 of the inner bearing end cap. The bearing housing 102 is slidably placed over the rotor shaft 86 and alignment studs 242, moving axially inwardly relative to the end of the rotor drive shaft 110, when the bearing housing 102 is shifted into a supporting relationship relative to the bearing 166. As best illustrated in FIGS. 23 and 24, as the bearing housing 102 moves axially inward relative to the drive shaft 110 end, the bearing housing engagement face 206 engages the motor housing support face 204.

In the illustrated embodiments, the bearing housing 102 includes an engagement face 206 that presents a straight section 244 of substantially constant diameter, as well as a tapered section 246 having a variable diameter that progressively increases toward the straight section and stops increasing at the straight section. The tapered section 246 is located at the axially inner end of the housing 102 so that the wider portion of the engagement face 206 engages the support face 204 first. The support face 204 of the motor frame assembly 52 preferably has a constant diameter. However, it is understood that the support face 204 of the motor frame assembly 52 can alternatively be tapered in part without departing from the spirit of the present invention. It is further appreciated that the motor housing support face 204 can include a tapered section in addition to, or in lieu of, the bearing housing 102 including a tapered section 246. In the illustrated embodiment, the bearing housing 102 presents the tapered section 246 to facilitate smooth transition of the bearing housing 102 from a non-supporting relationship into a supporting relationship.

Figure 24:
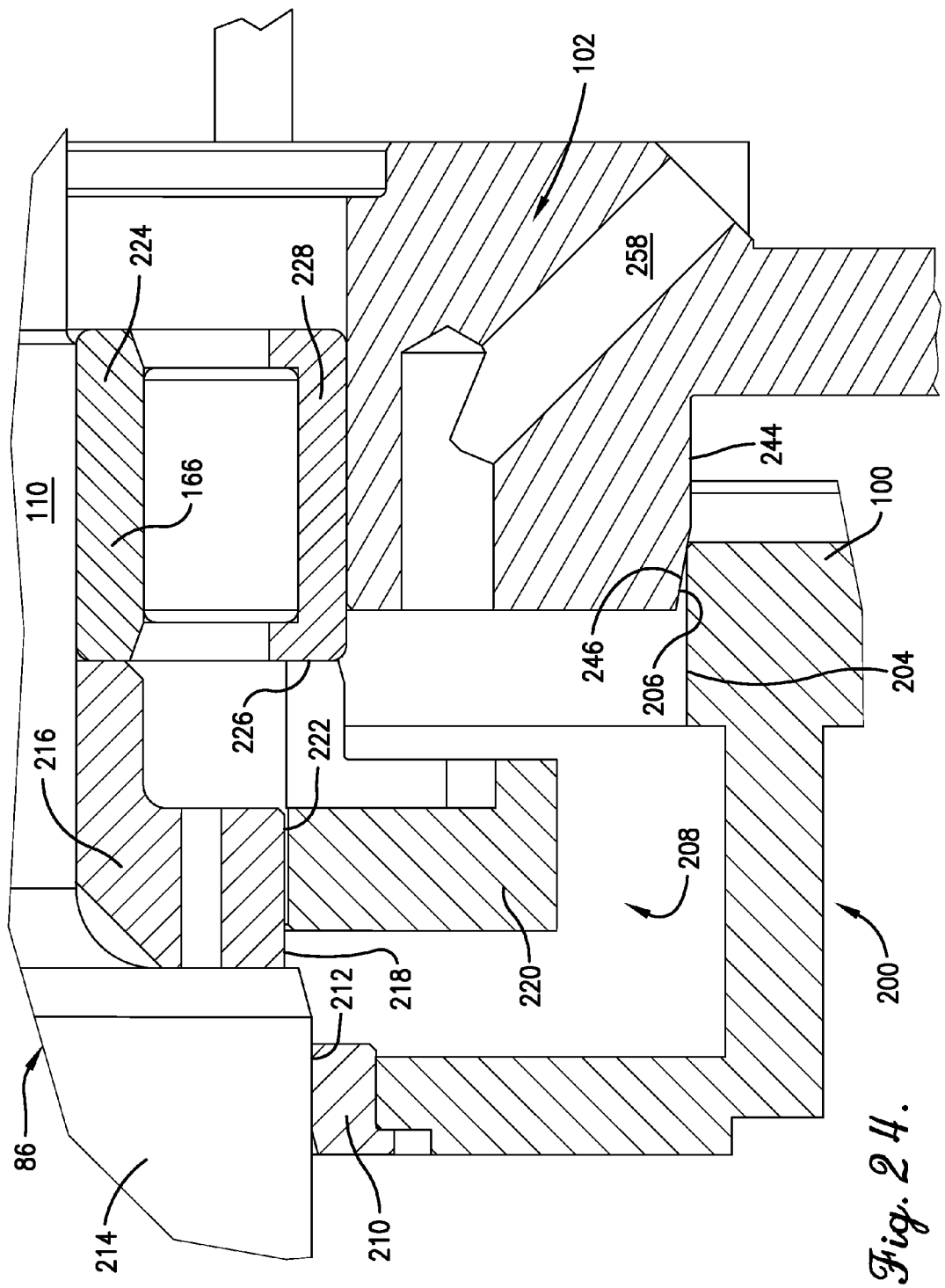
FIG. 24 is an enlarged, fragmented, and partially sectioned side view of the structure depicted in FIG. 23.
Figure 25:
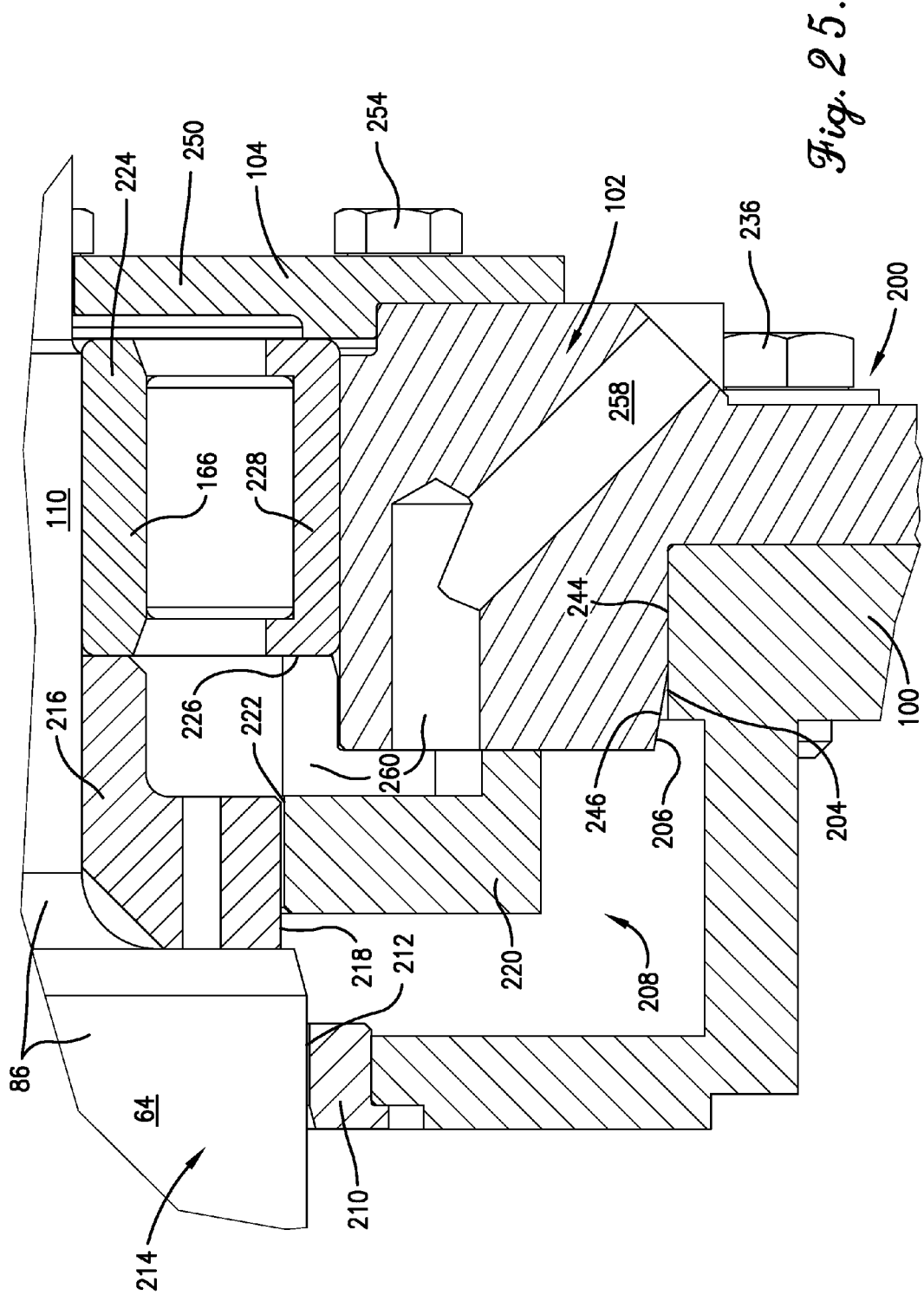
FIG. 25 is a view similar to FIG. 24, but depicting the bearing assembly in an installed configuration, and the shaft ring in an unsupporting relationship with the rotor.

Turning to FIG. 24, the illustrated embodiment shows the bearing housing 102 not in a supporting relationship with the rotor shaft 86. Consequently, the shaft ring 210 of the motor frame assembly 52 is in a supporting relationship with the rotor shaft 86. As the bearing housing 102 moves axially inward relative to the drive shaft 110 end, sliding contact between the tapered section 246 and the support face 204 moves the bearing housing 102 radially inward relative to the central rotational axis 106, thereby facilitating smooth entry of the bearing housing 102 into the central housing bore 208. More importantly, as the bearing housing 102 moves axially and radially into the supporting relationship, the bearing housing 102 correspondingly lifts the rotor shaft 86, such that the rotor axis 180 returns to the central rotational axis 106. The bearing housing 102 lifts the rotor shaft 86 off of the shaft ring 210, thereby assuming the supporting relationship, as best illustrated in FIG. 25.

Figure 26:
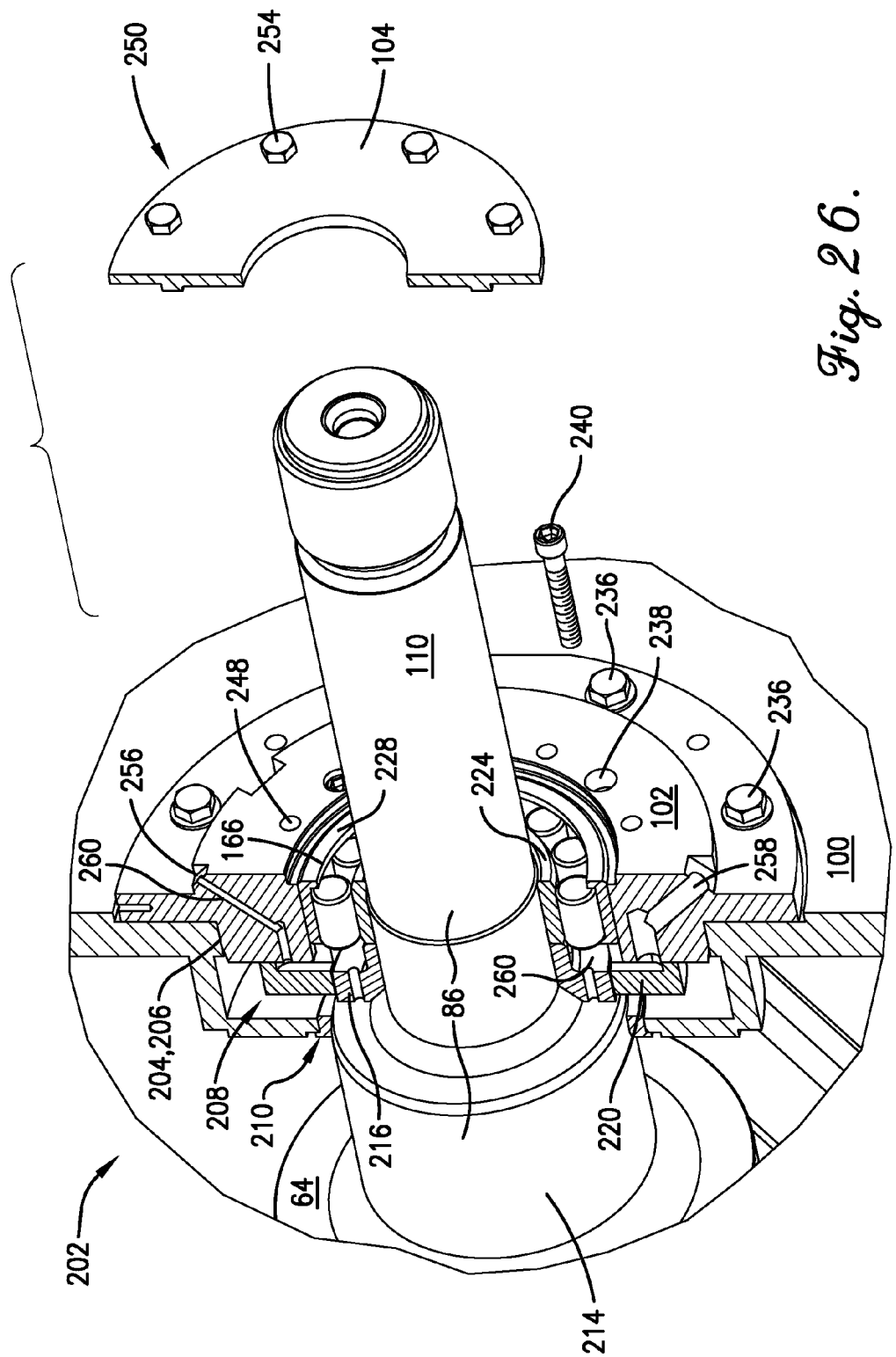
FIG. 26 is a partially sectioned front perspective view of the drive end of the motor assembly, depicting the bearing access plate removed.

Referring now to FIG. 26, the bearing assembly 202 is in a supporting relationship with the rotor shaft 86. The fasteners 236 securely attach the bearing housing 102 to the motor housing 56. The alignment studs 242 are removed from the fastener-receiving holes 238, and fasteners 240 (e.g., socket head cap screws) are passed through the same holes 238 to secure the inner bearing cap 220 to the bearing housing 102. The bearing housing 102 also includes a plurality of externally-facing fastener-receiving bores 248 for the securement of a removable bearing cover plate 250 axially adjacent the bearing 166 and coaxial the rotor shaft 86. The bearing cover plate 250 includes a plurality of fastener-receiving holes 252 that correspond to the bores 248 of the bearing housing. Fasteners 254 (e.g., bolts) pass through respective cover plate holes 252 and are connected to the bearing housing 102. The bearing cover plate 250 provides outer axial support to the bearing 166 when the bearing 166 is housed within the bearing housing 102. As illustrated, the bearing cover plate 250 can be removed to provide direct access to the bearing 166 when the bearing housing 102 is in supporting relationship with the bearing 166 and rotor shaft 86.

Disassembly of the bearing assembly 202 can be performed by reversing the order of the above discussed steps. More specifically, some of the fasteners 236 that secure the bearing housing 102 to the motor frame assembly 52 can be completely removed, while the remaining fasteners 236 are disengaged from the motor frame assembly 52 but remain in an engaged relationship with the bearing housing 102. The engaged fasteners 236 can be used to pry the housing 102 away from the motor frame assembly 52. After removal of the bearing housing 102, the bearing 166 can subsequently be removed. Any suitable means for removing the bearing 166 and other components mounted on the rotor shaft 86 (e.g., the bearing spacer 216 or inner bearing cap 220) can be used. An example of such is disclosed in U.S. Provisional Patent Application Ser. No. 61/937,229 entitled SYSTEMS, APPARATUSES AND METHODS FOR LIFTING, POSITIONING AND REMOVING A BEARING ASSEMBLY FROM A SHAFT, which is hereby incorporated by reference in its entirety herein, to the extent not inconsistent with the present disclosure.

Also seen in the illustrated embodiment, the bearing assembly 202 includes a lubricant fill channel 256 and a lubricant drain channel 258. The lubricant fill channel 256 provides an access point for applying lubricant to the bearing 166 while the bearing housing 102 is in supporting relationship with the bearing 166 and the rotor 64. In the assembled state, the lubricant fill channel 256 leads to a feed channel 260 within the inner bearing cap 220, thereby channeling lubricant into the rollers of the bearing 166. As lubrication is dispersed, the lubricant drainage follows the feed channels 260 to the opposite side of the inner bearing cap 220 and drains out of the lubricant drain channel 258 of the bearing housing 102.

Adjustable Rotor Sensor Carrier

Figure 27:
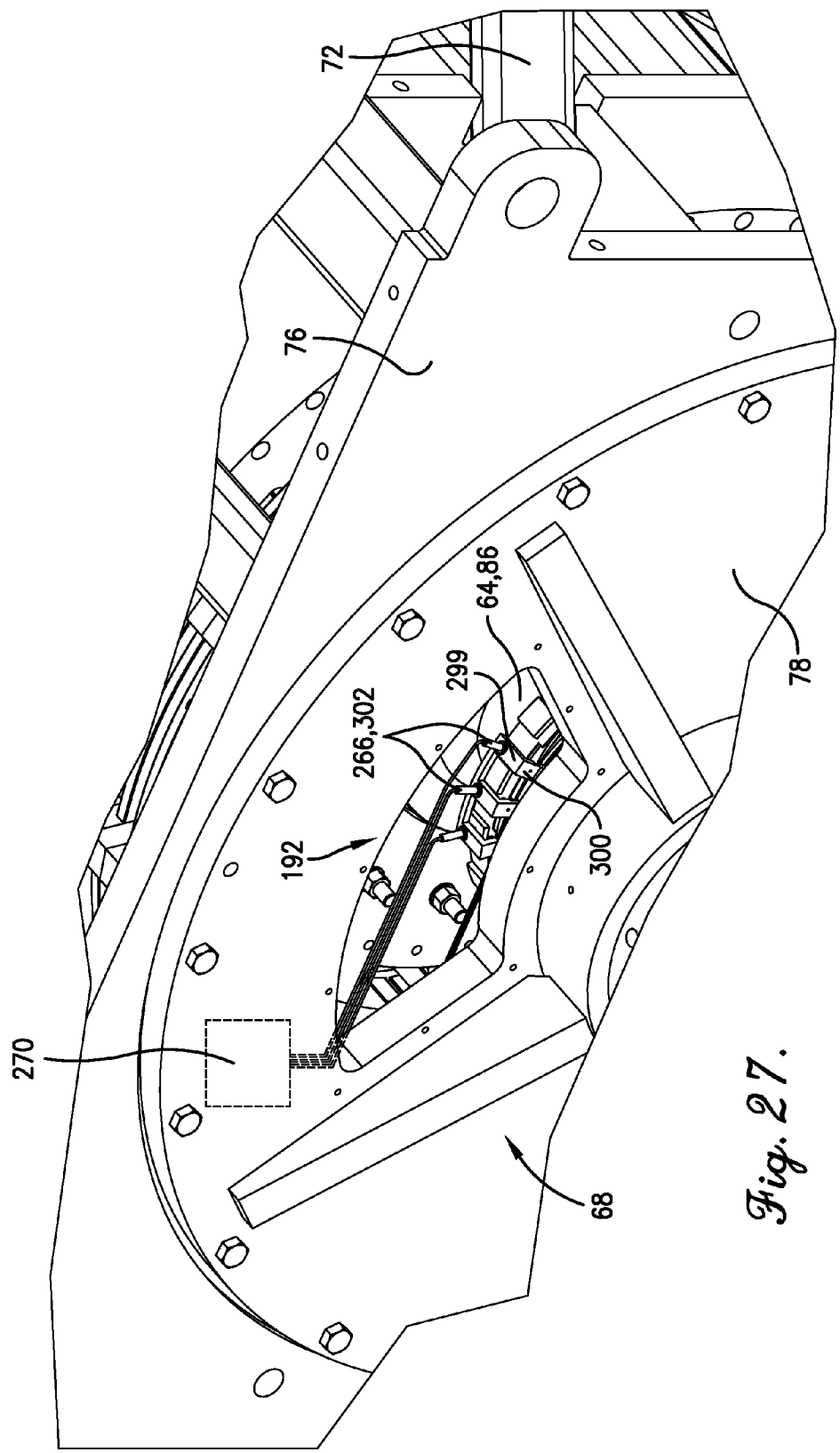
FIG. 27 is an enlarged, fragmented front perspective view of the closed end of the motor assembly, with another motor chamber access plate removed, also showing the sensor processor and sensor mechanism.

In the illustrated embodiments, the motor assembly 42 includes a rotor sensor mechanism 262 for broadly sensing at least one condition of the rotor. As can be appreciated by one of ordinary skill in the art, maintenance and calibration for a motor assembly of this size necessitates minimal displacement of major components (i.e., the rotor). Turning now to FIG. 27, removal of at least one of the access plates 80 presents a window 192 that provides access to a rotor sensor mechanism 262 disposed in the motor chamber 66. The rotor sensor mechanism 262 broadly includes a target component 264 fixed relative to the rotor 64 that rotates therewith, a sensor 266 configured to sense the target component 264, and an adjustable sensor carrier 268 that adjustably attaches the sensor 266 to the closed end bracket 78, thus adjustably coupling the sensor 266 to the motor frame assembly 52. The sensor mechanism 262 can further include a processor 270, such that the sensor 266 and processor 270 are in communication for calculating various characteristics of the rotor 64.

Figure 28:
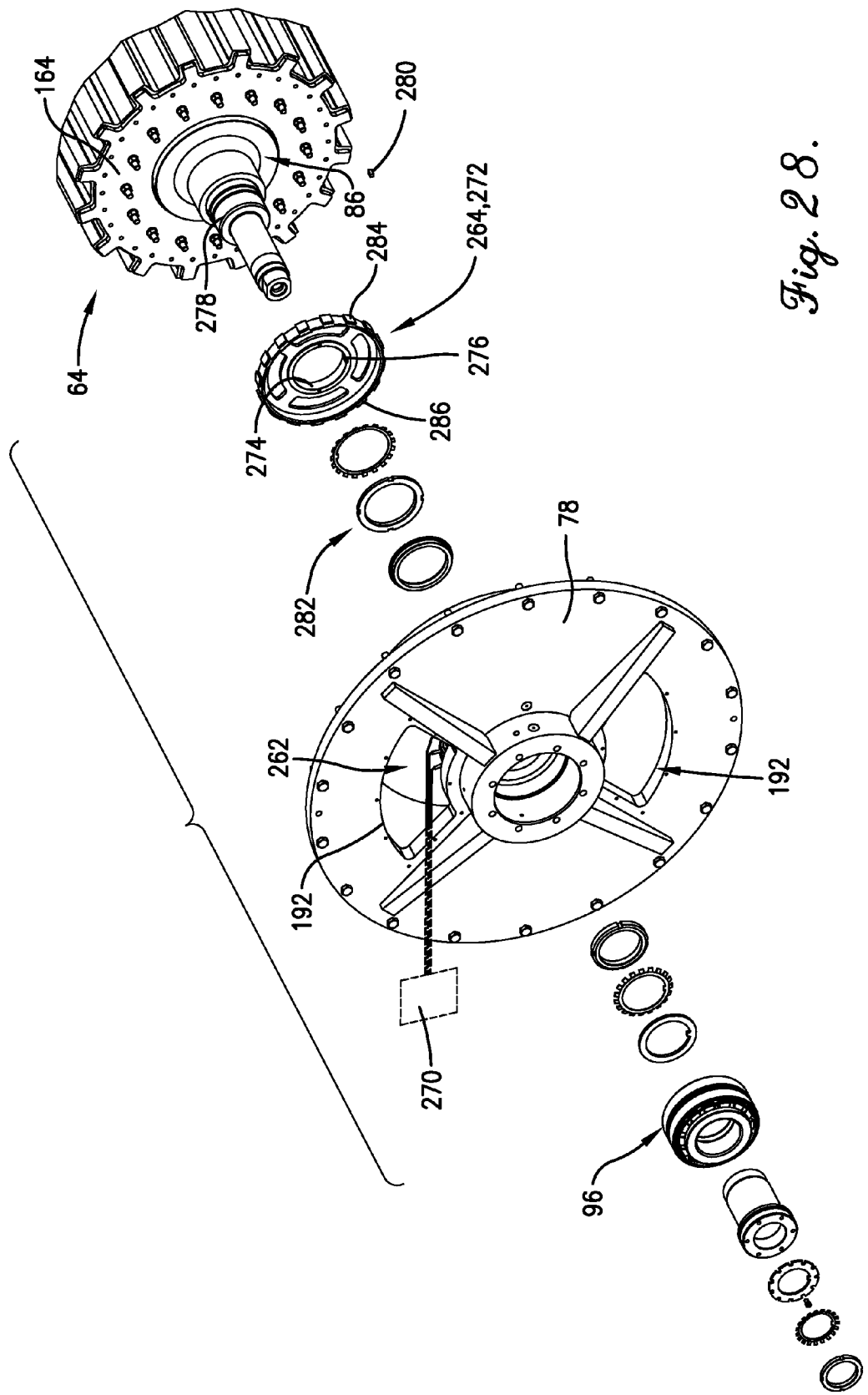
FIG. 28 is an exploded, fragmented, exploded front perspective view of the closed end bracket, sensor mechanism, bearing assembly, and rotor.

In the illustrated embodiment of FIG. 28, the target component 264 is in the form of a shutter wheel 272 fixed to the rotor 64. The shutter wheel 272 is preferably formed of ferrous material, although other suitable configurations may be used (e.g., a composite wheel with ferrous teeth, etc.) The shutter wheel 272 includes an inner engagement surface 274 having a keyway 276. The rotor shaft 86 includes an outer support surface 278 having a key 280 that corresponds with the shutter wheel keyway 276. The shutter wheel 272 is slidably received on the rotor shaft 86, such that a marriage between the key 280 and keyway 276 prevents relative rotation of the shutter wheel 272 to the rotor 64. The shutter wheel 272 includes a fastener assembly 282 that securely attaches the shutter wheel 272 to the rotor shaft 86. As can be appreciated by one of ordinary skill in the art, fastener assemblies for fixing various components to a rotor shaft are well known and will not be discussed any further. The shutter wheel 272 is axially interposed between the motor frame assembly 52 and the rotor 64. In the illustrated embodiment, the sensor mechanism 262 is attached to the axially inward-facing surface of the closed end bracket 78, although other couplings to the motor frame assembly 52 are considered.

Figure 29:
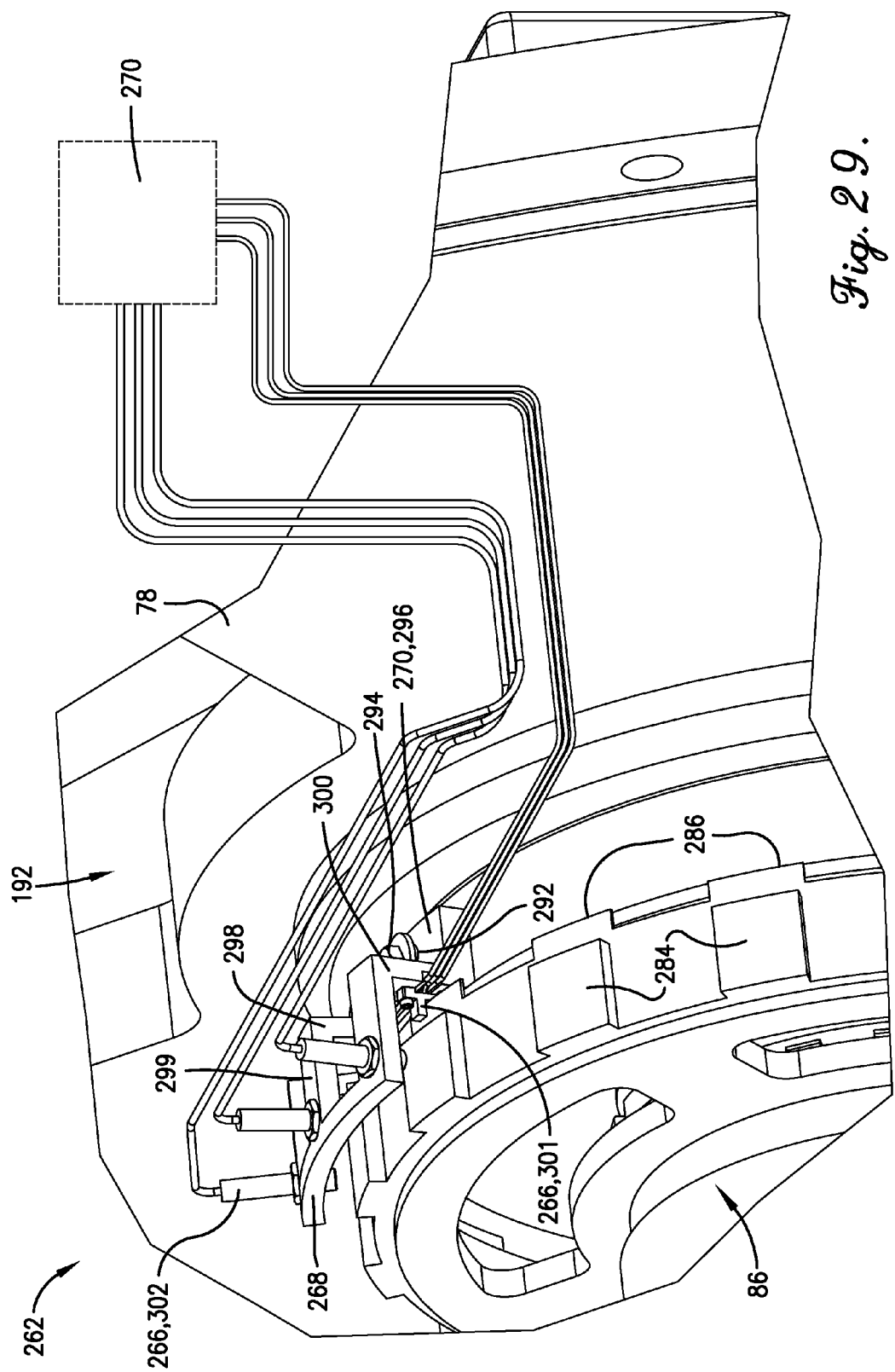
FIG. 29 is an enlarged, rear perspective view of the closed end bracket and sensor mechanism of FIG. 28.

The shutter wheel 272 includes a plurality of circumferentially spaced target teeth 284, 286. The illustrated embodiment includes a set of radially projecting radial target teeth 284 and a set of axially extending axial target teeth 286, as more clearly illustrated in FIG. 29. As will be readily appreciated by one of ordinary skill in the art, the principles of the present invention are not limited to the use of both radial target teeth 284 and axial target teeth 286, as they may be used interchangeably, in combination with one another, or replaced by a completely different configuration while remaining within the scope of some aspects of the invention.

Figure 30:
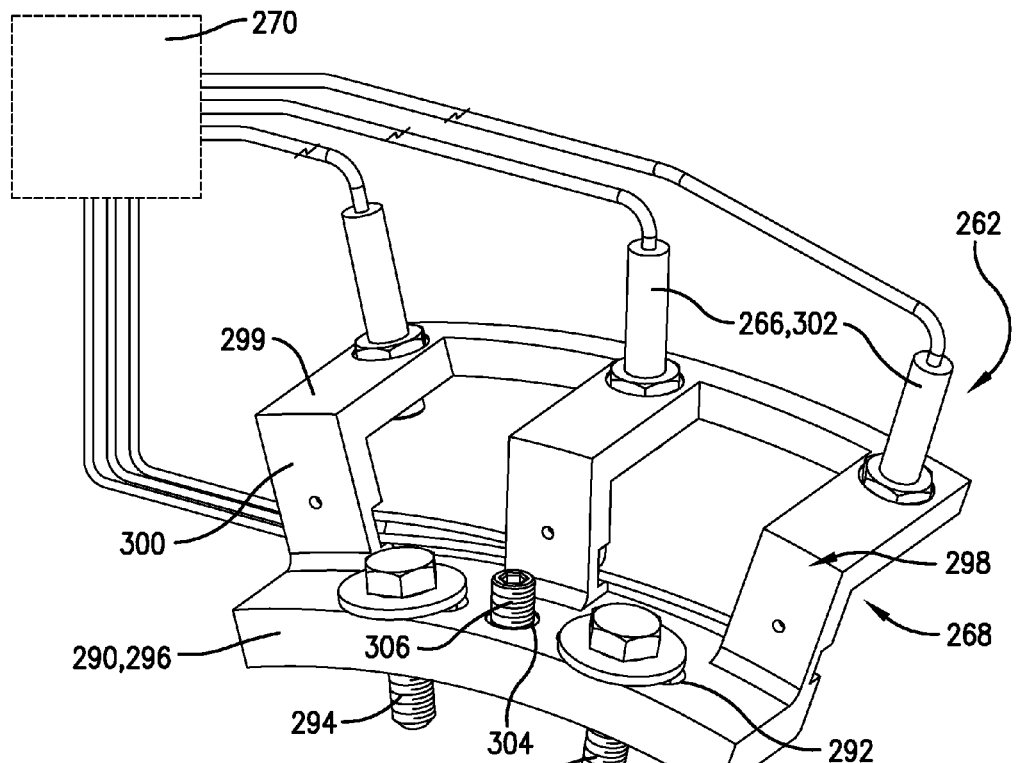
FIG. 30 is a top perspective view of the sensor carrier and sensors of FIGS. 27-29.
Figure 31:
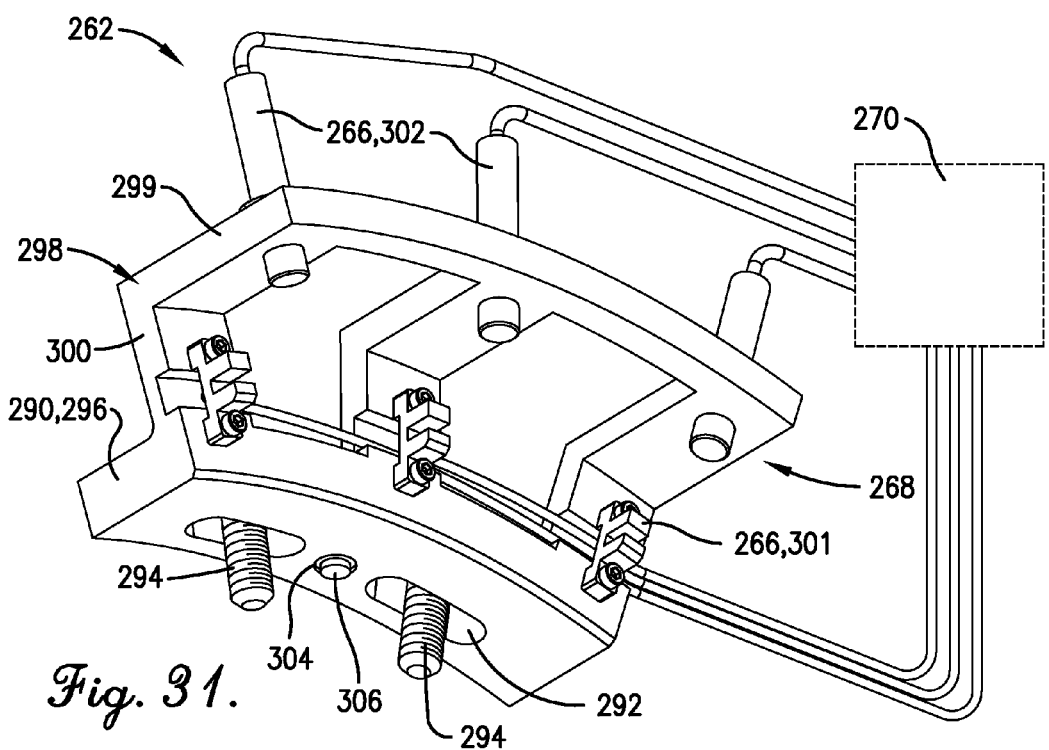
FIG. 31 is a bottom perspective view of the sensor carrier and sensors of FIGS. 27-30.
Figure 34:
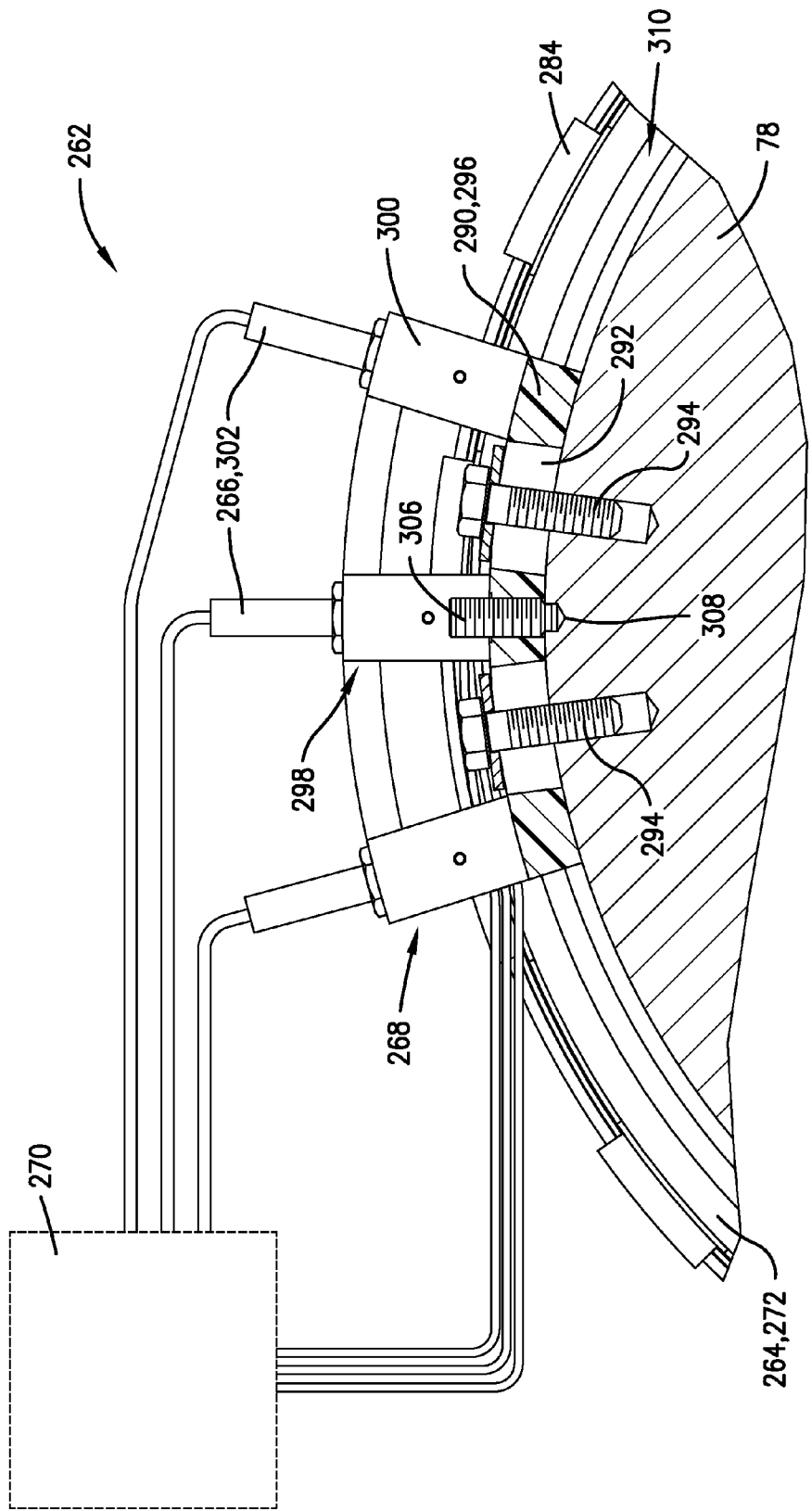
FIG. 34 is a cross-sectional view taken along line 34-34 of FIG. 33.

As shown in FIGS. 30 and 31, the sensor carrier 268 includes a sensor carrier bracket 290 adjustably attached to the closed end bracket 78 of the motor frame assembly 52. In the illustrated embodiment, the sensor carrier bracket 290 presents a pair of slotted openings 292 and fasteners 294 (e.g., bolts), with each fastener 294 passing through openings 292 to adjustably receive the sensor carrier 268 to the closed end bracket 78. More particularly, as best shown in FIG. 31, the slotted openings 292 each preferably extend primarily circumferentially to present an oval shape, thereby enabling circumferential shifting of the sensor carrier bracket relative to the motor frame assembly 52. The bracket 290 preferably comprises a mounting tab 296, in which the slotted openings 292 are defined, and a generally L-shaped sensor support 298 having one or more sensors 266 mounted thereon. The sensor support 298 includes a generally axially extending leg 299 and a generally radially projecting leg 300.

In the illustrated embodiment, three digital vane (axial) sensors 301 are fixed to the generally radially projecting leg 300, to project generally axially toward the axial target teeth 286 of the shutter wheel 272. The axial sensors 301 are preferably at least generally radially aligned with the axial target teeth 286 and face axially toward the axial target teeth 286. Three magnetic radial sensors 302 are fixed to the generally axially extending leg 299, to project generally radially toward the radial target teeth 284 of the shutter wheel 272. The radial sensors 302 are preferably at least generally axially aligned with the radial target teeth 284 and face radially toward the radial target teeth 284. In the preferred embodiment, the magnetic radial sensors 302 are spaced radially outwardly from the shutter wheel 272, such that the radial sensors 302 face radially inwardly toward the radial target teeth 284. The digital vane (axial) sensors 301 are adjustably positioned relative to the shutter wheel 272 to sense the axial target 286 teeth, while the magnetic radial sensors 302 are adjustably positioned relative to the shutter wheel 272 to sense the radial target teeth 284.

Each sensor 266, 301, 302 is preferably a Hall effect sensor, capable of sensing the relative position of a ferrous target as it passes the sensor 266, 301, 302. The sensors 266, 301, 302 are operably connected to the processor 270. A plurality of sensors 266, 301, 302, working in parallel with one another, can provide the processor 270 with the appropriate data for calculating the position, speed, and direction of rotation of the rotor 64 based upon movement of the target teeth 284, 286 relative to the sensors 266. Although the illustrated embodiments generally include magnetic proximity sensors for detecting relative position of the sensors 266, 301, 302 with a ferrous target component 264, various sensor technologies and target components can be considered for use within the scope of this invention. For example, the sensor mechanism may alternatively use a printed marking on the rotor shaft (or a target otherwise applied to the rotor shaft) and an optical sensor adjustably supported by the carrier. It is also within the scope of the present invention to have a various number of sensors, as one of ordinary skill in the art would appreciate.

With attention now to FIGS. 32 and 33, the target component 264, 272 is fixed relative the rotor 64. As a result, any calibrations of the sensor mechanism 262 can be performed on the sensor carrier 268. The slotted openings 292 of the sensor carrier bracket 290 allow for adjustable positioning of the sensor carrier 268, and thereby the sensors 266, relative the target component 264, 272. Thus, as sensing is processed and a precalibrated position is determined, the sensor carrier bracket 290 may then be fixedly secured to the closed end bracket 78. To facilitate return to the precalibrated position, the sensor carrier bracket 290 also presents an unslotted opening 304 and a fastener 306 for the opening (e.g., a set screw) to repeatedly fix the sensor carrier 268 into the precalibrated position. In the illustrated embodiment, upon determination of the precalibrated position, a small reference divot 308 is drilled into the mounting surface 310 of the closed end bracket 78 in direct alignment with the unslotted opening 304 of the fixedly secured sensor carrier bracket 290. Thereupon, a fastener 306 (e.g., set screw) is passed through the unslotted opening 304 and secured to the closed end bracket reference divot 308.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention set forth in the following claims.

What is claimed is:

1. An electric motor comprising:
a motor frame assembly including a motor frame and a motor housing,
said motor frame assembly defining an internal motor chamber;
a rotor rotatable relative to the motor frame assembly about an axis;
a stator fixed relative to the motor frame assembly; and
a rotor sensor mechanism for sensing a condition of the rotor,
said rotor sensor mechanism including
a target component comprising a shutter wheel fixed relative to the rotor for rotational movement therewith,
said shutter wheel including a plurality of targets,
a sensor configured to sense the targets, and
a sensor carrier adjustably supporting the sensor on the motor frame assembly so as to permit the sensor to be selectively positioned relative to the targets,
said rotor, said stator, and said rotor sensor mechanism being at least substantially received in said motor chamber,
said motor housing presenting an access window which provides access to the motor chamber, with the sensor carrier being adjacent the window,
said motor housing including a removable access plate which covers the window, with removal of said access plate providing access via the window to the sensor carrier.

2. The electric motor as claimed in claim 1,
said sensor carrier including a bracket adjustably coupled to the motor frame assembly,
said sensor being fixed to the bracket.

3. The electric motor as claimed in claim 2,
said bracket presenting at least one slotted opening,
said sensor carrier including at least one fastener received in the at least one opening,
said at least one fastener being coupled to the motor frame assembly.

4. The electric motor as claimed in claim 3,
said at least one slotted opening extending primarily circumferentially to allow circumferential shifting of the sensor carrier relative to the motor frame assembly.

5. The electric motor as claimed in claim 3,
said bracket including a mounting tab and a generally L-shaped sensor support,
said slotted opening being defined in the mounting tab,
said sensor being fixed to the support.

6. The electric motor as claimed in claim 3,
said bracket presenting at least one unslotted opening,
said sensor carrier including at least one fastener received in the at least one unslotted opening,
said at least one fastener being coupled to the motor frame assembly to enable repeatable positioning of the sensor carrier into a precalibrated position.

7. The electric motor as claimed in claim 6,
said bracket including a mounting tab and a generally L-shaped sensor support,
said slotted and unslotted openings being defined in the mounting tab,
said sensor being fixed to the support.

8. The electric motor as claimed in claim 1,
said targets comprising circumferentially spaced apart target teeth.

9. The electric motor as claimed in claim 8,
said target teeth comprising axially extending axial target teeth,
said sensor including an axial sensor,
said axial sensor being at least generally radially aligned with the axial target teeth and facing axially toward the axial target teeth.

10. The electric motor as claimed in claim 9,
said shutter wheel including a plurality of circumferentially spaced apart, radially projecting radial target teeth,
said sensor mechanism including a radial sensor configured to sense the radial target teeth,
said radial sensor being at least generally axially aligned with the radial target teeth and facing radially toward the radial target teeth, said sensor carrier adjustably supporting the radial sensor on the motor frame assembly so as to permit the radial sensor to be selectively positioned relative to the radial target teeth.

11. The electric motor as claimed in claim 10, said sensor carrier including a bracket adjustably coupled to the motor frame assembly, said axial and radial sensors being fixed to the bracket.

12. The electric motor as claimed in claim 11, said bracket presenting at least one slotted opening, said sensor carrier including at least one fastener received in the at least one opening, said at least one fastener being coupled to the motor frame assembly.

13. The electric motor as claimed in claim 12, said at least one slotted opening extending primarily circumferentially to allow circumferential shifting of the sensor carrier relative to the motor frame assembly.

14. The electric motor as claimed in claim 12, said bracket including a mounting tab and a generally L-shaped sensor support, said slotted opening being defined in the mounting tab, said axial and radial sensors being fixed to the support.

15. The electric motor as claimed in claim 14, said sensor support including a generally axially extending leg and a generally radially projecting leg, said radial sensor being fixed to the generally axially extending leg, said axial sensor being fixed to the generally radially projecting leg.

16. The electric motor as claimed in claim 12, said bracket presenting at least one unslotted opening, said sensor carrier including at least one fastener received in the at least one unslotted opening, said at least one fastener being coupled to the motor frame assembly to enable repeatable positioning of the sensor carrier into a precalibrated position.

17. The electric motor as claimed in claim 16, said bracket including a mounting tab and a generally L-shaped sensor support, said slotted and unslotted openings being defined in the mounting tab, said axial and radial sensors being fixed to the support.

18. The electric motor as claimed in claim 17, said sensor support including a generally axially extending leg and a generally radially projecting leg, said radial sensor being fixed to the generally axially extending leg, said axial sensor being fixed to the generally radially projecting leg.

19. The electric motor as claimed in claim 1, said sensor being configured to sense the relative position of the target component.

20. The electric motor as claimed in claim 19, said sensor mechanism including a processor for calculating the speed and direction of rotation of the rotor based upon movement of the targets relative to the sensor.

21. The electric motor as claimed in claim 1, said sensor comprising a Hall effect sensor, said target component being ferrous.

22. The electric motor as claimed in claim 1, said sensor being spaced radially outwardly from the shutter wheel, such that the sensor faces inwardly toward the target teeth.

* * * * *